United States Patent
Ohmae et al.

(10) Patent No.: US 6,755,554 B2
(45) Date of Patent: Jun. 29, 2004

(54) COLOR WHEEL ASSEMBLY AND COLOR SEQUENTIAL DISPLAY DEVICE USING THE SAME, COLOR WHEEL UNIT AND COLOR SEQUENTIAL DISPLAY DEVICE USING THE SAME, AND COLOR SEQUENTIAL DISPLAY DEVICE

(75) Inventors: Hideki Ohmae, Hyogo (JP); Mitsuhiro Wada, Osaka (JP); Kazunori Tanabe, Okayama (JP); Shigeru Aruga, Osaka (JP); Hirokazu Sakaguchi, Osaka (JP); Hisatoshi Shimose, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/864,333

(22) Filed: May 25, 2001

(65) Prior Publication Data

US 2002/0003704 A1 Jan. 10, 2002

(30) Foreign Application Priority Data

May 25, 2000 (JP) .................................. 2000-155016
Sep. 7, 2000 (JP) .................................. 2000-272158
Sep. 13, 2000 (JP) .................................. 2000-277782

(51) Int. Cl.$^7$ ................................................ F21V 9/10
(52) U.S. Cl. ..................... 362/293; 362/324; 362/284; 348/743; 348/748; 353/31
(58) Field of Search .................. 362/264, 284, 362/311, 324; 348/743, 748, 749; 353/31

(56) References Cited

U.S. PATENT DOCUMENTS

| | | | |
|---|---|---|---|
| 3,781,465 A | * 12/1973 | Ernstoff et al. ............. 348/742 |
| 4,523,224 A | 6/1985 | Longacre, Jr. | |
| 5,046,162 A | * 9/1991 | Ishikawa et al. ............. 348/270 |
| 5,220,464 A | 6/1993 | Lin | |
| 5,233,385 A | * 8/1993 | Sampsell ..................... 348/270 |
| 5,339,107 A | 8/1994 | Henry et al. | |
| 5,448,314 A | * 9/1995 | Heimbuch et al. .......... 348/270 |
| 5,467,146 A | * 11/1995 | Huang et al. ................ 348/743 |
| 5,528,714 A | * 6/1996 | Kingstone et al. .......... 362/581 |
| 5,623,349 A | 4/1997 | Clarke | |
| 5,774,196 A | * 6/1998 | Marshall ...................... 348/743 |
| 5,779,353 A | * 7/1998 | Kacheria ..................... 362/293 |
| 5,788,365 A | * 8/1998 | Hunt et al. .................. 362/293 |
| 5,868,482 A | 2/1999 | Edlinger et al. | |
| 6,024,453 A | 2/2000 | Edlinger et al. | |
| 6,046,782 A | 4/2000 | Hayakawa | |
| 6,048,080 A | * 4/2000 | Belliveau ..................... 362/282 |
| 6,113,252 A | * 9/2000 | Arlitt et al. ................. 362/282 |

* cited by examiner

Primary Examiner—Alan Cariaso
Assistant Examiner—Ismael Negron
(74) Attorney, Agent, or Firm—Wenderoth, Lind & Ponack, L.L.P.

(57) ABSTRACT

A field sequential color display device includes a color wheel assembly. The color wheel assembly has a color wheel which is divided into a plurality of color regions and a motor for rotating the color wheel. The motor contains a sensor for detecting rotation of the motor and the sensor outputs at least one pulse per one revolution of the motor. The color wheel assembly also has a spatial light modulator for displaying image data that is driving in synchronization with the pulse output by the sensor.

20 Claims, 27 Drawing Sheets

COLOR WHEEL ASSEMBLY AND COLOR SEQUENTIAL DISPLAY DEVICE USING THE SAME, COLOR WHEEL UNIT AND COLOR SEQUENTIAL DISPLAY DEVICE USING THE SAME, AND COLOR SEQUENTIAL DISPLAY DEVICE

FIELD OF THE INVENTION

The present invention relates to a display device using a spatial light modulator (SLM) or light valve which works at a considerably high speed and, more particularly, to a color wheel assembly and a field sequential color display device using the same, a color wheel unit and a field sequential color display device using the same, and a field sequential color display device, to display colors in a time-multiplexing and color sequential manner.

BACKGROUND OF THE INVENTION

In recent years, attention has been increasingly focused on large screen displays such as home theaters and presentations, and projectors are recently being commercialized which use a small reflective light valve of a liquid crystal on silicon (hereinafter, referred to as LCOS) in which a switching element, a reflection electrode or the like is formed on a silicon substrate or a digital micromirror device (hereinafter, referred to as DMD), and enlargedly project a display image with a projection lens to obtain a large screen display image.

The LCOS is one of the SLMs, and it has reflection pixels in a form of matrix, and can switch displays at a high speed using a video signal. In order to display moving pictures at a video rate, it is necessary that video of 60 frames can be displayed within one field. For that purpose, the liquid crystal response speed of at least 1/60=16.7 msec or lower is required. Further, in order to display at least three colors (RGB) during that time, a response speed of 5.6 msec is required. As examples of such a high-speed response liquid crystal, there are a ferroelectric liquid crystal, an antiferroelectric liquid crystals, an OCB (optically Compensated Bend) liquid crystal and the like in the OCR liquid crystal, a Bend orientation cell is used to self-compensate changes in the visibility angle direction using birefringence of the liquid crystal, and when this liquid crystal is combined with a negative optical compensation film, a wider visibility angle is realized, as well as a high-speed response is enabled.

The DMD is one of the SLMs, and is mainly used as a projection-type display. The DMD has hundreds of thousands or one million or more extremely minute mirrors on one chip, each of the mirrors corresponding to one pixel. ON/OFF of the DMD is controlled by inclining these mirrors to change the reflection angles of beams which are incident on the mirrors. For that purpose, the respective mirrors are mounted to one or more hinges which are mounted on a supporting post, and are separated from a control circuit situated below by an air gap. This control circuit applies static electricity, which selectively inclines the respective mirrors. When this is applied to a display, image data are loaded on a memory cell of the DMD, and the mirrors are inclined on the basis of these data to reflect light toward the ON direction or away from the ON direction.

As methods adopted in the projectors, when classified according to the number of SLMs required in the projector, a single-panel type and a three-panel type are mainly used. As an example of the three-panel-type projectors, there is one which modulates light beams of respective colors, which has been subjected to the color separation, by the corresponding SLMs, respectively, and then performs the color composition while projecting the light on a screen. In this method, three SLMs are used in parallel, the respective being used for red (R), green (G), and blue (B). On the other hand, in the single-panel-type projector, only one SLM is used, and R, G and B light beams are modulated successively in a time-multiplexing manner, or spatially in units of area or pixel, while using a single-panel SLM. Accordingly, in the single-panel-type projector which requires only one SLM, requests to hardware relating to the SLM are only one-third of those in the three-panel-type projector which requires three SLMs. This is not restricted to the projectors, but applies to all color display devices using the SLMs.

Hereinafter, the color display device using the single-panel projector is described.

As an example of the color display device using the single-panel projector, there is a time-multiplexing color sequential type color display device utilizing a time-multiplexing color mixture. In this time-multiplexing color sequential method, the pixels have red, green and blue values, respectively, and during each frame period, the pixels in the frame are addressed successively according to red, blue, and then green data. On the other hand, filters of the same colors as these colors are positioned in the form of a disk, a color wheel having at least three different color regions is synchronized with these data, and data corresponding to the respective colors are displayed by the SLM. At this time, the band of light incident on the SLM is controlled by the color wheel. As described above, the time-multiplexing field sequential color display device enables color display in a time-multiplexing manner and, when the time-multiplexing rate is higher than the standard display speed of 60 images/sec, the images are perceived by the eyes to have original colors.

The above-mentioned prior art field sequential color display device using the color filter is described with reference to FIG. 36. FIG. 36 is a diagram schematically illustrating an example of the prior art field sequential color display device using the color wheel. As shown in FIG. 36, the field sequential color display device comprises a lamp 1001, an ellipsoidal mirror 1002, an UV-IR cut-off filter 1003, a color wheel 1004, a condensing lens 1005, a field lens 1006, a reflective LCOS 1007, and a projection lens 1008.

The lamp 1001 is a discharging-type high output lamp such as a xenon lamp, a metal halide lamp, and an extra-high pressure mercury lamp.

The reflective LCOS 1007 is one of the SLM.

The color wheel 1004 is preferably situated in a position where beams are condensed the most. This is because the SLM should be turned off to prevent color mixture, while the color wheel is being rotated and a beam spot is passing through the boundary of the different color filters, and the shorter the OFF time is, the higher the temporal opening ratio is, whereby brighter displays are enabled. Therefore, it is preferable that the condensation spot on the color filter should be smaller to miniaturize the color wheel, otherwise a color wheel having a larger outer diameter is required, resulting in a considerably large size of the entire system.

The operation of the so-constructed prior art field sequential color display device is described. The lamp 1001 is positioned approximately in a focus position of the ellipsoidal mirror 1002 as a concave mirror, so that the emitted white light beams are condensed by the ellipsoidal mirror 1002 on the color filter of the color wheel 1004. The UV-IR cut-off filter 1003 filters out ultraviolet and infrared rays of the light emitted from the lamp 1001. The color wheel 1004 comprises red, blue, and green color filters which are positioned in the form of a disk and, in synchronization with the filtering of beams by the respective color filters, the LCOS 1007 displays image frames of the beam color. Normally, the color wheel 1004 is rotated one revolution per image frame in 1/60 sec, or at 3600 rpm. The condensing lens 1005 efficiently condenses light which is transmitted through the color wheel 1004, and irradiates the LCOS 1007. The field lens 1006 is used for condensing light which is transmitted through the LCOS 1007 on the projection lens 1008.

In this prior art field sequential color display device, there are at least three color sub-frames during one frame frequency, the sub-frames being red, green and blue, respectively. The LCOS 1007 switches display images at a considerably high speed for the respective colors, and modulated beams of respective colors are enlargedly projected on a screen (not shown) by using the projection lens 1008. Since videos of the respective colors (R, G and B) are successively projected and displayed on the screen in 1/60 sec, these videos are perceived by the eyes as after-images, whereby full-color videos are recognized. In the above-mentioned prior art time-multiplexing color sequential type color display device, the color wheel is rotated by a motor or the like at a high speed. Therefore, it is quite important how the rotation speed and phase of the color wheel are controlled, to accurately and precisely acquire timing information for switching the colors of red, green and blue, and further control the SLM to perform modulation in synchronization with the color.

Accordingly, in the prior art field sequential color display device, a reflective photo-sensor has been commonly used for detecting the position of the color wheel. FIG. 37 is a schematic diagram illustrating a color wheel, and a cross-sectional view illustrating a color wheel assembly which is constituted by a color wheel and a motor. A hub 372 of the color wheel 1004 is painted black in its entirety, and an aluminum tape 373 is pasted as an index mark at a position of the joint part of a green filter 1004G and a red filter 1004R. The reflective photo-sensor 374 is mounted on a case 375 which houses the color wheel 1004, and when the color wheel 1004 is rotated, the reflective photo-sensor 374 detects the aluminum tape as a reflecting surface and generates a pulse signal of one pulse per one revolution. Thereby, the control circuit of the SLM performs the switching from a green video drive signal to a red video drive signal, as well as controls the rotation speed and phase of the motor so that the color wheel 1004 is rotated at one frame frequency. An example of the method for receiving a pulse feedback from the color wheel and controlling the rotation speed and phase of the motor is described in detail in U.S. Pat. No. 5,868,482.

In the above-mentioned prior art field sequential color display device using the color wheel, when a desired display quality is to be obtained without color separation, the number of revolutions of the color wheel 1004 should be about 10000 rpm or larger. However, in this high-speed rotation, the centrifugal force applied to the color wheel 1004 becomes quite large, whereby the aluminum tape 373 pasted on the color wheel 1004 as the index mark is soon peeled off and flew into pieces.

In addition, since the color wheel 1004 is positioned in close proximity to the lamp 1001 as well as the beams which have condensed in a small spot on the color wheel 1004 are subjected to the color separation, the color wheel 1004 is easily affected by the heat and its temperature immediately rises at 70° C. or more. Accordingly, the adhesive of the aluminum tape 373 bonded on the color wheel 1004 as the index mark has a poor adhesion as compared to room temperatures. Therefore, the tape 373 becomes more easily peeled off. Further, when the color wheel is housed in the case, the temperature of the color wheel case itself is increased due to heat radiated from the lamp or absorption of unnecessary light, whereby it becomes difficult to cool the color wheel and the motor in the case.

Further, in the manufacture of the color wheel, steps of painting the hub 372 in black, and positioning and bonding the aluminum tape 373 as the index mark on the hub are required. Further, the color wheel is housed in the case to be protected from the dust, and therefore, a step of installing the photo-sensor 374 for detecting the index mark formed on the color wheel 1004, at a predetermined position of the color wheel case 375 is required. These steps both should be carried out accurately, which leads to increases in costs.

Further, a motor 371 is mounted at an opening below the flange of the color wheel 1004, and the color wheel 1004 is rotated by the motor in the case 375. At this time, the photo-sensor 374 for detecting the index mark is mounted on the case 375 so as to protrude toward the color wheel 1004. As shown in FIG. 37, the color wheel 1004 opposes to a bottom surface 375a and a case lid 375b of the color wheel case body 375. The color wheel 1004 is in proximity the bottom surface of the color wheel case body 375.

When the color wheel 1004 is rotated, the circumferential speeds are different between in the vicinity of the rotation axis and the outer circumference part. Therefore, an air current from the center of the color wheel 1004 toward the outer radius occurs in a gap between the color wheel 1004 and the case body 375 (shown by arrows in FIG. 37). At this time, the photo-sensor 374 interferes with the air current, leading to noises.

Further, to allow the photo-sensor 374 to read the index mark, the hub area through which light does not directly pass is required, and this presents a problem in minimizing the diameter of the color wheel or miniaturizing.

The color wheel rotates color filters which are made of glass at a high speed, so it is easily electrostatically charged due to friction with air when the color wheel is charged, it attracts dust in the air, thereby reducing the transmittance of the filter. Even when the color wheel is housed in the case, since the rotation of the color wheel creates wind pressure, and air frequently flows into or out of the gap of the case, the filters similarly become dirty with time. Especially when the color wheel is housed in the case, it is necessary to provide an opening for incoming or outgoing light, and the incoming/outgoing air into/from the opening causes the dust to be caught in the case.

When the color wheel which is constituted by thin glass filters rotates at a high speed and cuts through the air, a whistling sounds occur, and it becomes the source of large noise, together with the electromagnetic sounds of the motor. Especially when the color wheel is housed in the case, the air current is generated by the wind pressure resulting from the rotation of the color wheel from an opening which is provided for incoming or outgoing light, and the incoming/outgoing air into/from the opening causes noise.

In the field sequential color display device as shown in FIG. 36, a condensation spot 1009 of light emitted from the lamp 1001 is formed on the color wheel 1004. The size of the condensation spot 1009 depends on the size of an emitting part 1001a of the lamp 1001, and the larger the emitting part 1001a is, the larger the condensation spot 1009 is.

FIG. 38 is a diagram for explaining the relationship between the color wheel 1004 and the condensation spot 1009. Hereinafter, the problems of the prior art field sequential color display device are described with reference to FIG. 38.

The color wheel 1004 comprises, for example, red, green and blue fan-shaped color filters 1004R, 1004G and 1004E which are combined in the form of a disk, and a full-color display is enabled by rotating the color wheel in synchronization with the display of the LOOS 1007. However, when the condensation spot 1009 extends across two adjacent color filters, light beams which have been transmitted through the two color filters are incident on the LCOS simultaneously, resulting in a mixture of colors, whereby an image having a different color from the one which is to be normally displayed is displayed on the screen.

Practically, while boundaries 1004RG, 1004GB and 1004BR of the respective color filters 1004R, 1004G and 1004E are passing through the condensation spot 1009, the LCOS 1007 is controlled to display in black, i.e., in the OFF state, whereby the above-mentioned problem of color mixture is solved. (Hereinafter, the period during which the LCOS 1007 is controlled to display black is referred to as a black display period.)

However, it is known that the light source used in the field sequential color display device, such as the lamp 1001, has the emitting part 1001a whose size (hereinafter, referred to as an arc length) varies during the use. Usually, the arc length tends to be longer with the lighting time of the lamp 1001. Therefore, while the lamp 1001 is being used, the size of the condensation spot 1009 on the color wheel 1004 is gradually increased and, in some cases, the period during which the condensation spot 1009 extends across two adjacent color filters becomes longer than the black display period of the LCOS 1007. In these cases, the initially set black display period cannot prevent the formation of a color-mixed optical image on the LCOS 1007, whereby an image having a different color from the one which is to be normally displayed is displayed on the screen.

Assuming that the size of the condensation spot 1009 which is formed on the color wheel 1004 is gradually increased with changes in the arc length of the lamp 1001, the black display period of the LCOS 1007 can be set to be longer. However, the longer the black display period is, the more the ratio of light which irradiates the LCOS 1007 and contributes to the original image display is reduced. Therefore, in an initial stage of use when the arc length of the lamp 1001 is relatively short, an unnecessary black display period is set, whereby the light utilization efficiency is reduced and the luminance of the image projected on the screen is reduced.

SUMMARY OF THE INVENTION

It is an object of the present invention to provide a color wheel assembly comprising a color wheel and a motor for rotating the color wheel, in which the position of the color wheel can be accurately detected even at high-speed rotation or at elevated temperatures, and a field sequential color display device using this color wheel assembly.

It is another object of the present invention to provide a color wheel unit comprising a color wheel, a motor, and a color wheel case, which can prevent noise caused by housing of the color wheel in the color wheel case, as well as effectively cool the color wheel case, and a field sequential color display device using this color wheel unit.

It is another object of the present invention to provide a field sequential color display device which can prevent color mixture without setting the black display period of the LCOS unnecessarily long even when the size of the emitting part of the light source is increased in use, and enables bright and high-quality image displays.

Other objects and advantages of the present invention will become apparent from the detailed description and specific embodiments described are provided only for illustration since various additions and modifications within the spirit and scope of the invention will be apparent to those of skill in the art from the detailed description.

A color wheel assembly according to a 1st aspect of the present invention comprises a color wheel which is divided into plural color regions, and a motor for rotating the color wheel, in which the motor contains a sensor for detecting rotation of the motor, and the sensor outputs at least one pulse per one motor revolution.

According to a 2nd aspect of the present invention, in the color wheel assembly of the 1st aspect, the sensor is a magnetic sensor, and the magnetic sensor outputs at least one pulse per one motor revolution.

According to a 3rd aspect of the present invention, in the color wheel assembly of the 1st aspect, the sensor is an optical sensor, and the optical sensor outputs at least one pulse per one motor revolution.

A color wheel assembly according to a 4th aspect of the present invention comprises a color wheel which is divided into plural color regions, and a motor for rotating the color wheel, in which the motor and the color wheel are aligned with each other, and a sensor which is provided inside the motor outputs at least one pulse per one motor revolution at designated color switching of the color wheel.

According to a 5th aspect of the present invention, in the color wheel assembly of the 4th aspect, the alignment between the motor and the color wheel is carried out by putting a common pin into a positioning hole which is previously formed on the color wheel and a positioning hole which is previously formed on a rotor as a rotating part of the motor.

According to a 6th aspect of the present invention, in the color wheel assembly of the 4th aspect, the alignment between the motor and the color wheel is carried out by putting in a common key in a positioning keyway which is previously formed on the color wheel and a positioning keyway which is previously formed on a rotor as a rotating part of the motor.

According to a 7th aspect of the present invention, in the color wheel assembly of the 1st or 4th aspect, the sensor which is provided inside the motor is configured to be movable in the motor so that the position of the sensor can be finely adjusted in a peripheral direction of the motor.

A field sequential color display device according to an 8th aspect of the present invention includes a color wheel assembly comprising: a color wheel which is divided into plural color regions; and a motor for rotating the color wheel, in which the motor contains a sensor for detecting rotation of the motor, the sensor outputs at least one pulse per one motor revolution, and a spatial light modulator for displaying image data is driven in synchronization with the pulse which is output by the sensor.

A field sequential color display device according to a 9th aspect of the present invention includes a color wheel assembly comprising: a color wheel which is divided into plural color regions; and a motor for rotating the color wheel, in which the motor and the color wheel are aligned to each other, and a sensor which is provided inside the motor outputs at least one pulse per one motor revolution at designated color switching of the color wheel, and a spatial light modulator for displaying image data is driven in synchronization with the pulse which is output by the sensor.

A field sequential color display device according to a 10th aspect of the present invention includes a color wheel assembly comprising: a color wheel which is divided into plural color regions; and a motor for rotating the color wheel, in which the motor contains a sensor for detecting rotation of the motor, the sensor outputs at least one pulse per one motor revolution, and a spatial light modulator for displaying image data is driven in synchronization with a pulse which is obtained by electrically shifting the phase of the pulse output by the sensor forward or backward.

A field sequential color display device according to an 11th aspect of the present invention includes a color wheel assembly comprising: a color wheel which is divided into plural color regions; and a motor for rotating the color wheel, in which the motor and the color wheel are aligned with each other, a sensor which is provided inside the motor outputs at least one pulse per one motor revolution at designated color switching of the color wheel, and a spatial light modulator for displaying image data is driven in synchronization with a pulse which is obtained by electrically shifting the phase of the pulse output by the sensor forward or backward.

A color wheel unit according to a 12th aspect of the present invention comprises: a color wheel which is divided into plural color regions; a motor for rotating the color wheel; and a color wheel case for housing the color wheel and the motor, in which an outer surface of the color wheel case has a radiating means having plural projections and depressions formed.

A color wheel unit according to a 13th aspect of the present invention comprises: a color wheel which is divided into plural color regions; a motor for rotating the color wheel; and a color wheel case for housing the color wheel and the motor, in which an outer surface of the motor has a radiating means having plural projections and depressions formed.

A color wheel unit according to a 14th aspect of the present invention comprises: a color wheel which is divided into plural color regions; a motor for rotating the color wheel; and a color wheel case for housing the color wheel and the motor, in which the color wheel case has a hollow structure which is filled with a liquid.

According to a 15th aspect of the present invention, in the color wheel unit of the 14th aspect, the color wheel case has a liquid inlet and a liquid outlet, and the liquid is injected into the liquid inlet and discharged from the liquid outlet, thereby circulating the liquid in the color wheel case.

A color wheel unit according to a 16th aspect of the present invention comprises: a color wheel which is divided into plural color regions; a motor for rotating the color wheel; and a color wheel case for housing the color wheel and the motor, in which a light incident/radiating part of the color wheel case is sealed with a light-transmittable member.

According to a 17th aspect of the present invention, in the color wheel unit of the 16th aspect, the light-transmittable member is coated by an anti-reflection coating at least on one side thereof.

According to an 18th aspect of the present invention, in the color wheel unit of the 16th aspect, the light-transmittable member is coated by an ultraviolet-reflection coating at least on one side thereof.

According to a 19th aspect of the present invention, In the color wheel unit of the 16th aspect, the light-transmittable member is an ultraviolet-absorbing glass pane.

According to a 20th aspect of the present invention, in the color wheel unit of the 16th aspect, the light-transmittable member is coated by a heat-reflecting coating at least on one side thereof.

According to a 21st aspect of the present invention, in the color wheel unit of the 16th aspect, the light-transmittable member is a heat-absorbing glass pane.

According to a 22nd aspect of the present invention, in the color wheel unit of the 16th aspect, the light-transmittable member is a transparent lens.

A color wheel unit according to a 23rd aspect of the present invention comprises: a color wheel which is divided into plural color regions; a motor for rotating the color wheel; and a color wheel case for housing the color wheel and the motor, in which a cushioning material is inserted at a junction of the color wheel case.

A color wheel unit according to a 24th aspect of the present invention comprises: a color wheel which is divided into plural color regions; a motor for rotating the color wheel; and a color wheel case for housing the color wheel and the motor, in which a cushioning material is inserted at a junction between the color wheel case and the motor.

According to a 25th aspect of the present invention, in the color wheel unit of the 23rd or 24th aspect, the cushioning material is an O-ring, which is provided completely around the junction of the color wheel case which is divided into two.

A color wheel unit according to a 26th aspect of the present invention comprises; a color wheel which is divided into plural color regions; a motor for rotating the color wheel; and a color wheel case for housing the color wheel and the motor, in which a cushioning material is inserted at a fixing part for installing the color wheel case on a chassis.

A field sequential color display device according to a 27th aspect of the present invention comprises: a light source; a condensing means for condensing light emitted from the light source; a color wheel unit comprising a color wheel which is divided into red, green and blue regions, a motor for rotating the color wheel, and a color wheel case for housing the color wheel and the motor, and selectively transmitting or reflecting light of red, green and blue bands in a predetermined order, out of the light which has been condensed by the condensing means; an illuminating means for condensing the light which has been transmitted or reflected by the color wheel unit, and illuminating a spatial light modulator; a spatial light modulator for modulating the light incident from the illuminating means; and a projection means for projecting the light modulated by the spatial light modulator on a screen, in which the color wheel unit is air-cooled by a fan, and a radiating means having projections and depressions formed thereon is provided on an outer surface of the color wheel case or an outer surface of the motor.

A field sequential color display device according to a 28th aspect of the present invention comprises: a light source; a condensing means for condensing light emitted from the light source; a color wheel unit comprising a color wheel which is divided into red, green and blue regions, a motor for rotating the color wheel, and a color wheel case for housing the color wheel and the motor, and selectively transmitting or reflecting light of red, green and blue bands in a predetermined order, out of the light which has been condensed by the condensing means; an illumination means for condensing the light which has transmitted or reflected by the color wheel unit, and illuminating a spatial light modulator; a spatial light modulator for modulating the light incident from the illumination means; and a projection means for projecting the light which has been modulated by the spatial light modulator on a screen, in which the color wheel unit is used air-cooled by a fans and the color wheel case has a hollow structure, which is filled with a liquid.

A field sequential color display device according to a 29th aspect of the present invention comprises: a light source; a condensing means for condensing light emitted from the light source; a color wheel unit comprising a color wheel which is divided into red, green and blue regions, a motor for rotating the color wheel, and a color wheel case for housing the color wheel and the motor, and selectively transmitting or reflecting light of red, green and blue bands in a predetermined order, out of the light which has been condensed by the condensing means; an illumination means for condensing the light which has been transmitted or reflected by the color wheel unit, and illuminating a spatial light modulator; a spatial light modulator for modulating the light incident from the illumination means; and a projection means for projecting the light which has been modulated by the spatial light modulator on a screen, in which the color wheel unit is air-cooled by a fan, and a light incident/radiating part of the color wheel case is sealed with a light-transmittable member.

A field sequential color display device according to a 30th aspect of the present invention comprises: a light source; a condensing means for condensing light emitted from the light source; a color wheel unit comprising a color wheel which is divided into red, green and blue regions, a motor for rotating the color wheel, and a color wheel case for housing the color wheel and the motor, and selectively transmitting or reflecting light of red, green and blue bands in a predetermined order, out of the light which has been condensed by the condensing means; an illumination means for condensing the light which has been transmitted or reflected by the color wheel unit, and illuminating a spatial light modulator; a spatial light modulator for modulating the light incident from the illumination means; and a projection means for projecting the light which has been modulated by the spatial light modulator on a screen, in which the color wheel unit is air-cooled by a fan, and a cushioning material is inserted at a junction of the color wheel case, a junction between the color wheel case and the motor, or a fixing part for installing the color wheel case on a chassis.

A field sequential color display device according to a 31st aspect of the present invention comprises: a light source; a condensing means for condensing light emitted from the light source; a color wheel unit comprising a color wheel which is divided into red, green and blue regions, a motor for rotating the color wheel, and a color wheel case for housing the color wheel and the motor, and selectively transmitting or reflecting light of red, green and blue bands in a predetermined order, out of the light which has been condensed by the condensing means; an illumination means for condensing the light which has been transmitted or reflected by the color wheel unit, and illuminating a spatial light modulator; a spatial light modulator for modulating the light incident from the illumination means; and a projection means for projecting the light which has been modulated by the spatial light modulator on a screen, in which an envelope which is filled with a liquid is provided between the light source and the illumination means, and the color wheel unit is positioned in the envelope, and a radiating means having plural projections and depressions formed thereon is provided on an outer surface of the color wheel case or an outer surface of the motor.

A field sequential color display device according to a 32nd aspect of the present invention comprises: a light source; a condensing means for condensing light emitted from the light source; a color wheel unit comprising a color wheel which is divided into red, green and blue regions; a motor for rotating the color wheel; and a color wheel case for housing the color wheel and the motor, and selectively transmitting or reflecting light of red, green and blue bands in a predetermined order, out of the light which has been condensed by the condensing means; an illumination means for condensing the light which has been transmitted or reflected by the color wheel unit, and illuminating a spatial light modulator; a spatial light modulator for modulating the light incident from the illumination means; and a projection means for projecting the light which has been modulated by the spatial light modulator on a screen, in which an envelope which is filled with a liquid is provided between the light source and the illumination means, and the color wheel unit is positioned in the envelope, and the color wheel case has a hollow structure, which is filled with a liquid.

A field sequential color display device according to a 33rd aspect of the present invention comprises: a light source; a condensing means for condensing light emitted from the light source; a color wheel unit comprising a color wheel which is divided into red, green and blue regions, a motor for rotating the color wheel, and a color wheel case for housing the color wheel and the motor, and selectively transmitting or reflecting light of red, green and blue bands in a predetermined order, out of the light which has been condensed by the condensing means; an illumination means for condensing the light which has been transmitted or reflected by the color wheel unit, and illuminating a spatial light modulator; a spatial light modulator for modulating the light incident from the illumination means; and a projection means for projecting the light which has been modulated by the spatial light modulator on a screen, in which an envelope which is filled with a liquid is provided between the light source and the illumination means, and the color wheel unit is positioned in the envelope, and a light incident/radiating part of the color wheel case is sealed with a light-transmittable member.

A field sequential color display device according to a 34th aspect of the present invention comprises: a light source; a condensing means for condensing light emitted from the light source; a color wheel unit comprising a color wheel which is divided into red, green and blue regions, a motor for rotating the color wheel, and a color wheel case for housing the color wheel and the motor, and selectively transmitting or reflecting light of red, green and blue bands in a predetermined order, out of the light which has been condensed by the condensing means; an illumination means for condensing the light which has been transmitted or reflected by the color wheel unit, and illuminating a spatial light modulator; a spatial light modulator for modulating the light incident from the illumination means; and a projection means for projecting the light which has been modulated by the spatial light modulator on a screen, in which an envelope which is filled with a liquid is provided between the light source and the illumination means, and the color wheel unit is positioned in the envelope, and a cushioning material is inserted at a junction of the color wheel case, a junction between the color wheel case and the motor, or a fixing part for installing the color wheel case on a chassis.

A field sequential color display device according to a 35th aspect of the present invention comprises: a light source; a condensing means for condensing light emitted from the light source; a color selection means for selectively transmitting or reflecting light of red, green and blue bands in a predetermined order, out of the light which has been condensed by the condensing means; an illumination means for condensing the light which has been transmitted or reflected by the color selection means, and illuminating a spatial light modulator; a spatial light modulator for modulating the light incident from the illumination means; a projection means for projecting the light which has been modulated by the spatial light modulator on a screen; and a shading means for shading part of the light incident on the color selection means or the light which has been transmitted or reflected by the color selection means, and preventing light of a different color band from that of a desired color which is to be displayed on the screen, from being incident on the spatial light modulator.

According to a 36th aspect of the present invention, in the field sequential color display device of the 35th aspect, the shading means is constituted by a member for shading light, and has a light transmission part of a predetermined size, through which the light is passed.

According to a 37th aspect of the present invention, in the field sequential color display device of the 36th aspect, in which the size of the light transmission part of the shading means varies with a wavelength of the light which has been transmitted or reflected by the color selection means.

According to a 38th aspect of the present invention, the field sequential color display device of the 36th aspect comprises: a light elimination means for eliminating part of light of a specific wavelength band, from the light which is incident on the light transmission part of the shading means.

According to a 39th aspect of the present invention, in the field sequential color display device of the 35th aspect, the shading means is positioned on a radiation side of the color selection means.

According to a 40th aspect of the present invention, in the field sequential color display device of the 35th aspect, the shading means is positioned at a 5 mm or smaller air gap with the color selection means.

According to a 41st aspect of the present invention, in the field sequential color display device of the 35th aspect, the light source is an extra-high pressure mercury lamp.

According to a 42nd aspect of the present invention, in the field sequential color display device of the 35th aspect, the condensing means is an ellipsoidal mirror.

According to a 43rd aspect of the present invention, in the field sequential color display device of the 42nd aspect, the color selection means has a light transmitting surface or reflecting surface which is positioned in the vicinity of a long focus of the ellipsoidal mirror.

According to a 44th aspect of the present invention, in the field sequential color display device of the 35th aspect, the color selection means is a color wheel comprising fan-shaped red, green and blue color filters which are positioned in the form of a disk, and successively transmits light of the respective color bands by rotating the color wheel.

According to a 45th aspect of the present invention, in the field sequential color display device of the 44th aspect, the shading means shades part of incident light with respect to a rotational direction of the color wheel, but does not shade the light with respect to a radial direction of the color wheel.

According to a 46th aspect of the present invention, in the field sequential color display device of the 45th aspect, the shading means is a diaphragm having an opening of a predetermined size, through which the incident light is passed, an opening width of the diaphragm with respect to the rotational direction of the color wheel is set to be equivalent to or smaller than a diameter of a condensation spot which is formed on the color wheel in an initial stage of use of the light source, and an opening width of the diaphragm with respect to the radial direction of the color wheel is set to be larger than the diameter of the condensation spot.

According to a 47th aspect of the present invention, in the field sequential color display device of the 35th aspect, a plane orthogonal to an optical axis of the shading means is approximately circular in cross section.

According to a 48th aspect of the present invention, in the field sequential color display device of the 47th aspect, the shading means is approximately columnar.

According to a 49th aspect of the present invention, in the field sequential color display device of the 47th aspect, the shading means is approximately conical.

DETAILED DESCRIPTION OF THE PREFERRED EMBODIMENTS

[Embodiment 1]

Hereinafter, a color wheel assembly according to the first embodiment of the present invention will be described with reference to FIGS. 1 and 2.

Figure 1:
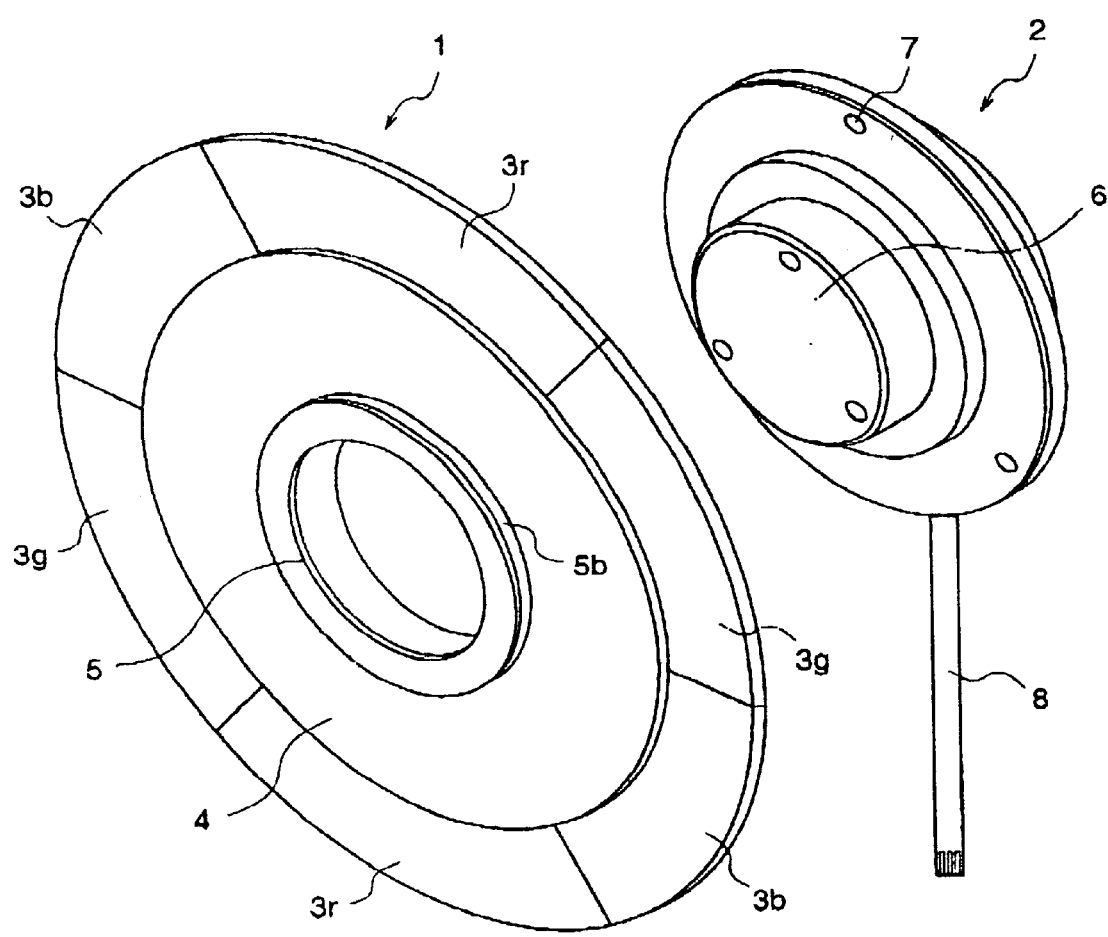
FIG. 1 is a diagram schematically illustrating an example of a color wheel assembly according to a first embodiment of the present invention.

FIG. 1 is a diagram schematically illustrating an example of the color wheel assembly of the first embodiment. As shown in FIG. 1, the color wheel assembly of the first embodiment is constituted by a color wheel 1 and a motor 2.

The color wheel 1 comprises red (R), green (G) and blue (B) color filters 3r, 3g and 3b, which are sandwiched and fixed by hubs 4 and 5 on opposing sides.

Each of the color filters 3r, 3g, and 3b is a glass pane of a thickness of 1 mm, and its outside shape is processed approximately in the form of a fan having a 60°-interior angle. An optical thin film is coated on these color filters 3r, 3g and 3b, respectively, on the surface of the glass pane, such that transmitted white light is modulated into light of R, G and B, respectively, and two filters for each color, i.e., 6 filters in total, are prepared.

The hubs 4 and 5 which are made of aluminum are each in the form of disk. The hub 4 has an opening at its the center, and these hubs 4 and 5 are joined by the motor 2 and a clamper 9 (see FIG. 2).

The color filters 3r, 3g and 3b are fixed by the hubs 4 and 5 in this way. When the hub 4 is positioned so that a surface on which a wall 5b is formed faces upward, the color filters 3r, 3g and 3b are mounted such that the same color filters face each other across the center engaging against the wall 5b. Then, the hub 5 is put on the color filters 3r, 3g and 3b, and fixed to the hub 4 with an adhesive or screws, whereby the color filters 3r, 3g and 3b are sandwiched by the hubs 4 and 5.

The motor 2 is, for example, a ball bearing type DC brushless motor, and comprises a rotor part 6 including a ball bearing, an axis, a coil, a magnet and the like, and a bracket part 7 which covers the rotor part 6. A drive signal is given from outside the motor 2 through a lead 8, thereby rotating the rotor part 6 at a predetermined rpm. As a matter of course, the color wheel 1 which is joined with the rotor part 6 rotate together.

Figure 2:
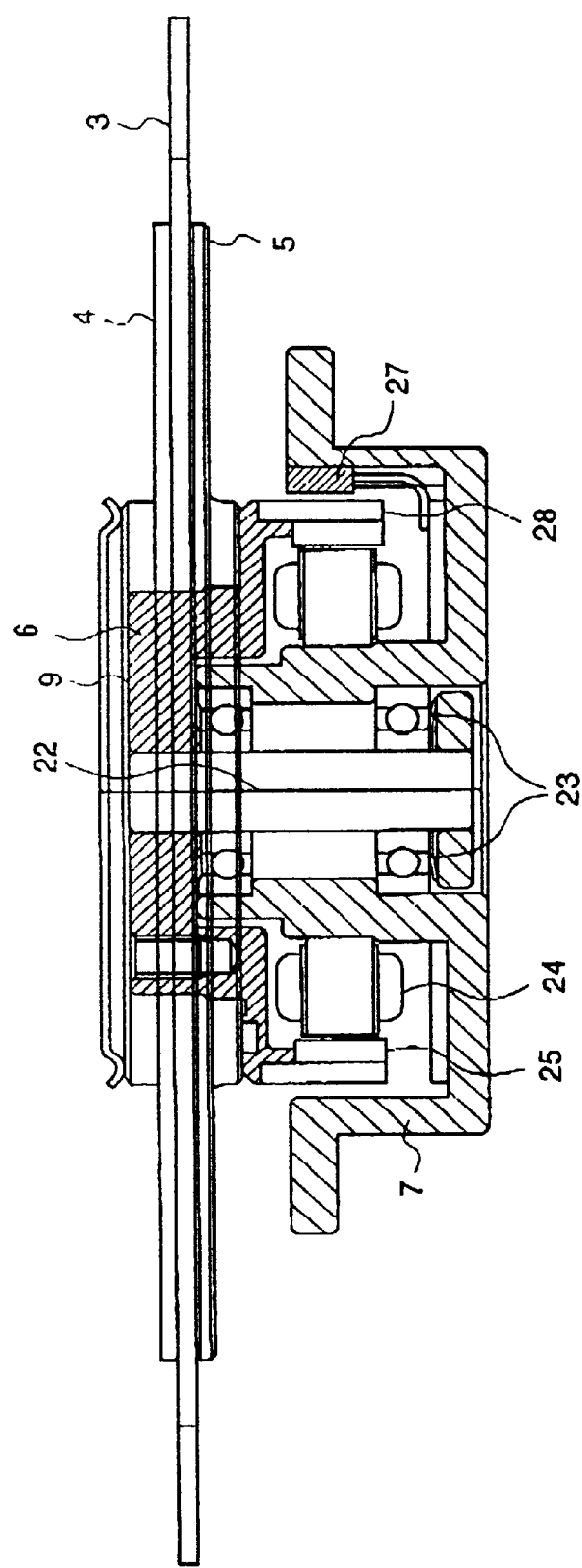
FIG. 2 is a cross-sectional view illustrating the color wheel assembly according to the first embodiment.

FIG. 2 is a cross-sectional view illustrating an example of the color wheel assembly according to the first embodiment. The description is given taking a case where the motor 2 is an outer-rotor-shaped brushless DC motor as an example.

The motor 2 is constituted mainly by the rotor part 6 and the bracket part 7. The rotor part 6 is a rotating part, which is fixed by bearings 23 using a shaft 22 as an axis. By passing a current through a coil 24, a torque is generated by the interaction of the rotor part 6 with a permanent magnet 25.

In the bracket part 7, a Hall IC 27 is installed as a magnetic sensor. Every time a detecting magnet 28 mounted on the rotor part 6 rotates and passes through the Hall IC 27, a pulse signal is generated by magnetoelectric conversion characteristics of the Hall IC 27.

The Hall IC 27 is a hybrid of a Hall element and a waveform shaping IC, while it can be only a Hall element. In this first embodiment, a three-terminal Hall IC is, for example, used as the Hall IC 27, and by providing a DC 5V power supply, it outputs a Low signal when detecting the magnet 28 and otherwise outputs a High signal.

As described above, the Hall IC 27 as the magnetic sensor is provided inside the motor 2, and a pulse signal is generated by the magnetoelectric conversion characteristics of the Hall IC 27 every time the detecting magnet 28 which is installed in the rotor part 6 rotates and passes through the Hall IC 27 as the magnetic sensor, whereby the pulse signal for detecting the position of the color wheel 1 can be generated only by the color wheel 1 and the motor 2 for rotating the color wheel.

Further, when the magnetic sensor is provided inside the motor 2, it is not required to paste the aluminum tape as the index mark on the color wheel 1, and accordingly, a position detection signal can be obtained stably also at high-speed rotation or at elevated temperatures.

Further, when the magnetic sensor is provided inside the motor 2, even when the color wheel is provided in a case to protect it against dust, it does not interfere with air currents in the case, thereby preventing the occurrence of noise.

Further, when the magnetic sensor is provided inside the motor 2, it is not required to provide a hub area through which light is not directly transmitted, whereby the diameter of the color wheel can be reduced and miniaturized.

In this first embodiment, the magnetic sensor is used as the sensor, while this sensor can be an optical sensor and, for example, a reflective photo-sensor can be used. In this case, the Hall IC 27 shown in FIG. 2 is replaced with a reflective photo-sensor, and the detecting magnet 28 is replaced with aluminum tape from which light is reflected. Further, in place of pasting an aluminum tape, it is possible that part of the rotor part side of the motor has a shiny reflecting surface, and the remaining part has a black surface which absorbs light or a grained surface which causes light to scatter. On the contrary, it is also possible that part of the rotor part side of the motor has a black surface which absorbs light or a grained surface which causes light to scatter, and the remaining part has a shiny surface from which light is reflected.

In this first embodiment, the outer-rotor-shaped brushless DC motor is used as the motor 2 as an example, while the shape of the motor is not restricted to this.

[Embodiment 2]

When a color wheel assembly according to the present invention is to be used in a field sequential color display device, the positional relationship between the color wheel and the motor is significantly important. A pulse signal is generated from the motor as in the above-mentioned first embodiment, then the pulse signal is compared with a reference signal to control the speed and phase of the motor, and the color switching of the filters of the color wheel in the field sequential color display device is made to be driven according to the color of light which is modulated by the SLM. Accordingly, in order to output the pulse signal at a predetermined color switching, the mounting of the color wheel and the motor should be univocally decided. Besides, it is preferable that their initially adjusted states should be maintained.

Hereinafter, a color wheel assembly according to the second embodiment is described with reference to FIG. 3.

Figure 3:
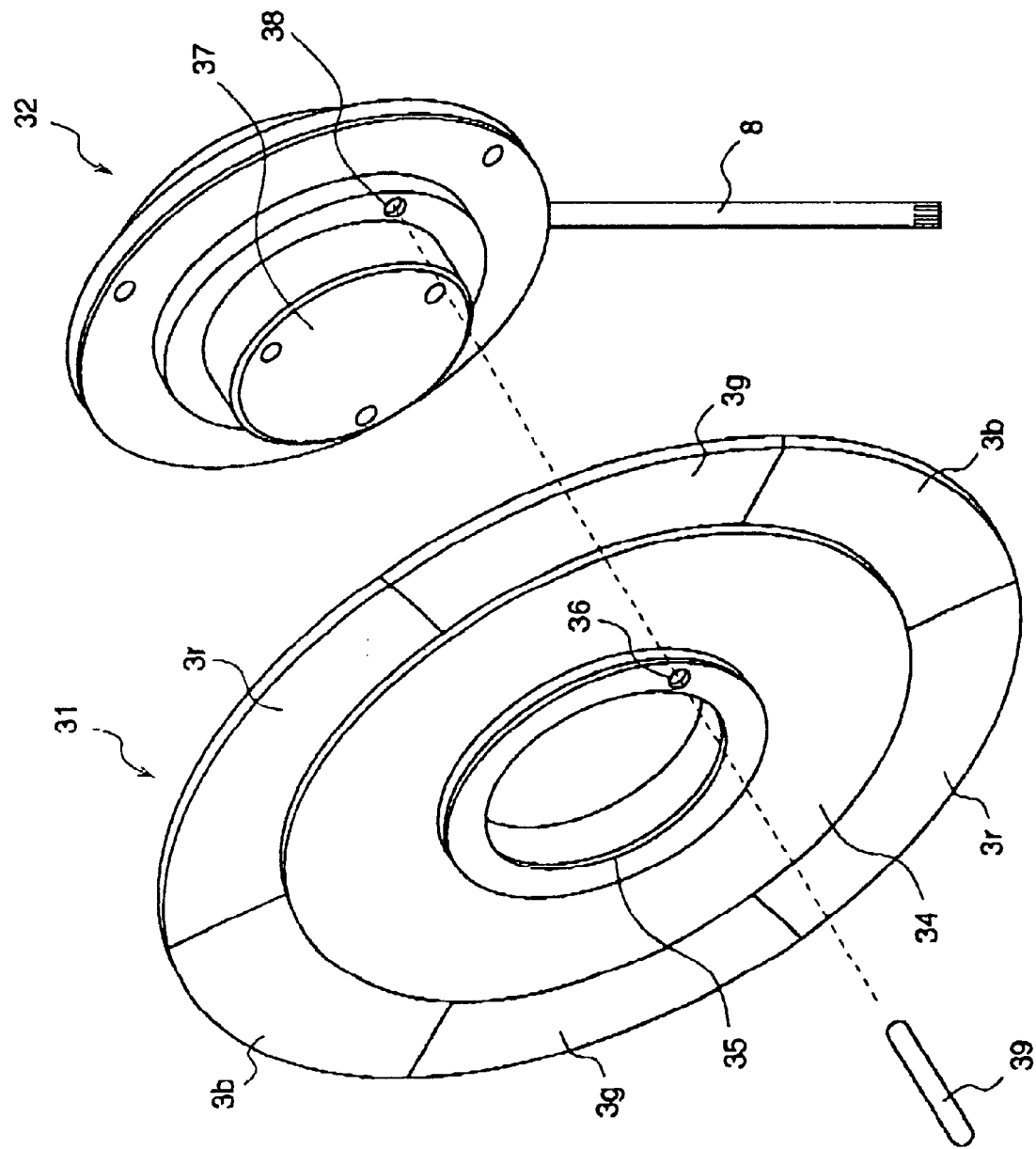
FIG. 3 is a diagram schematically illustrating an example of a color wheel assembly according to a second embodiment of the present invention.

FIG. 3 is a diagram schematically illustrating an example of the color wheel assembly of the second embodiment. The color wheel assembly of the second embodiment is different from the color wheel assembly of the aforementioned first embodiment only in that it positions a color wheel and a motor. The same reference numerals as those in the first embodiment denote the same or corresponding elements.

The color wheel assembly of the second embodiment is constituted by a color wheel 31 and a motor 32.

The color wheel 31 comprises red (R), green (G) and blue (B) color filters 3*r*, 3*g* and 3*b*, which are sandwiched and fixed by hubs 34 and 35 on opposing sides. Positioning holes 36 and 38 are provided at the periphery of an opening of the hub 34 of the color wheel 31, connected with the motor 32, and a rotor part 37 of the motor 32, respectively.

The positioning of the color wheel 31 and the motor 32 is carried out by aligning the positioning hole 36 which is provided at the periphery of the opening at the center of the hub 34 of the color wheel 31, connected with the motor 32, and the positioning hole 38 which is provided at the rotor part 37 of the motor 32, and then press-fitting a pin 39 in the holes to tix the color wheel and the motor. It is more desirable that the color wheel 31 and the motor 32 are thereafter fixed further using a damper or the like.

As described above, when the common positioning pin 39 is plugged into the positioning hole 36 which is previously formed in the color wheel 31 and the positioning hole 38 which is previously formed in the rotor part 37 as the rotating part of the motor 32, the effects of the color wheel assembly of the first embodiment can be obtained, as well as the positioning of the color wheel 31 and the motor 32 can be easily carried out, and the decided states can also be maintained at the high-speed rotation of the motor 32.

[Embodiment 3]

Hereinafter, a color wheel assembly according to the third embodiment of the present invention will be described with reference to FIG. 4.

Figure 4:
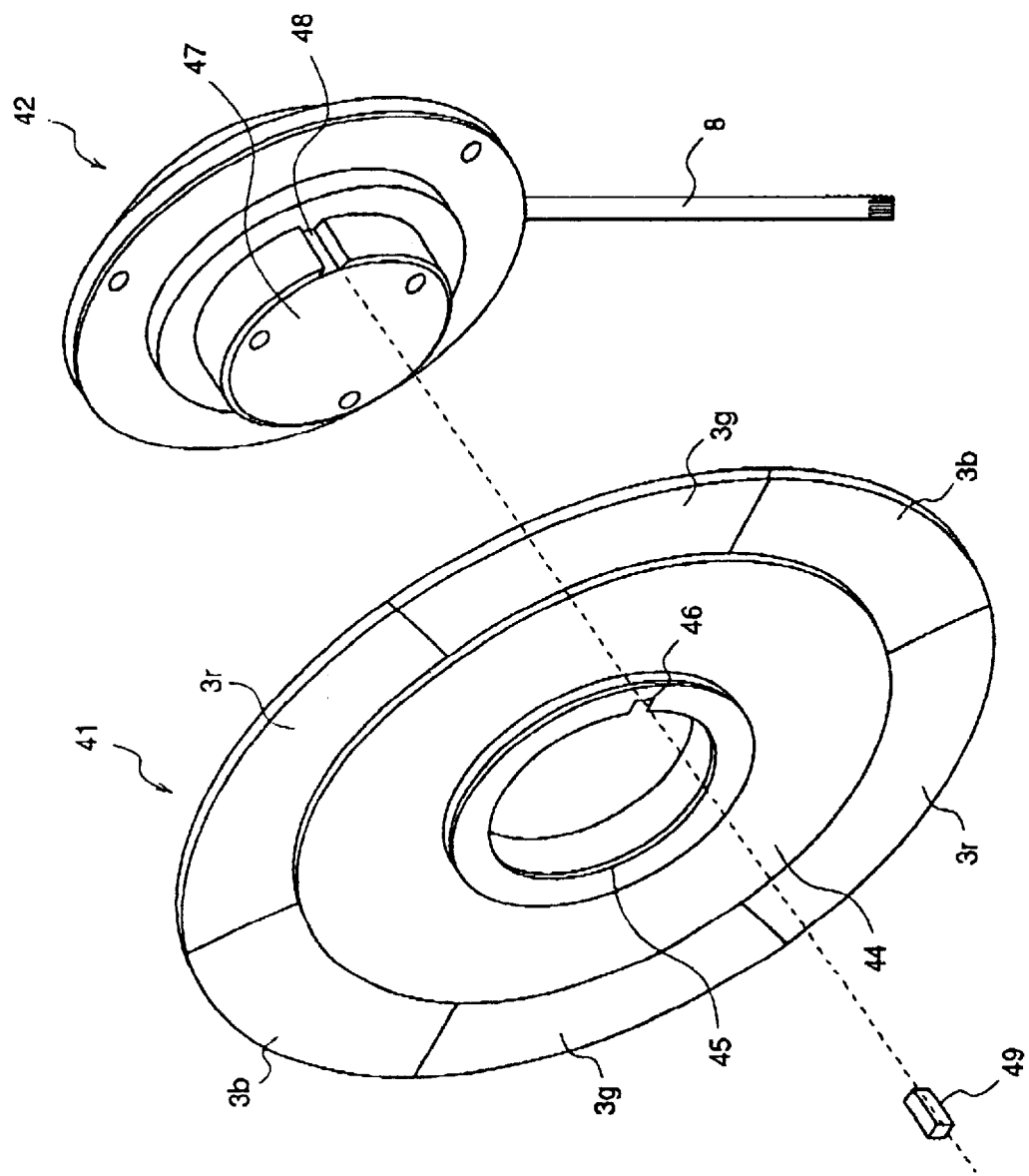
FIG. 4 is a diagram schematically illustrating an example of a color wheel assembly according to a third embodiment of the present invention.

FIG. 4 is a diagram schematically illustrating an example of the color wheel assembly of the third embodiment. The color wheel assembly of the third embodiment is different from the color wheel assembly of the first embodiment only in that it positions a color wheel and a motor. The same reference numerals as those in the first embodiment denote the same or corresponding elements.

The color wheel assembly of the third embodiment is constituted by a color wheel 41 and a motor 42.

The color wheel 41 comprises red (R), green (G) and blue (B) color filters 3*r*, 3*g* and 3*b*, which are sandwiched and fixed by hubs 44 and 45 on opposing sides. Further, keyways 46 and 48 are provided at the periphery of an opening of the hub 44 of the color wheel 41, connected with the motor, and a rotor part 47 of the motor 42, respectively.

The positioning of the color wheel 41 and the motor 42 is carried out by aligning the keyway 46 which is provided at the periphery of the opening at the center of the hub 44 of the color wheel 41, connected with the motor 42, with the keyway 48 which is provided at the rotor part of the motor 42, and press-fitting a key 49 in the keyways 46 and 48 to fix the color wheel 41 and the motor 42. It is more desirable that the color wheel 41 and the motor 42 are thereafter further fixed using a damper or the like.

As described above, when the keyway 46 which is previously formed on the color wheel 41 and the keyway 48 which is previously formed on the rotor part 47 as the rotating part of the motor 42 are aligned with each other, and the key 49 is press-fitted therein to fix the color wheel 41 and the motor 42, the effects of the color wheel assembly of the first embodiment are obtained, as well as allowing the color wheel 41 and the motor 42 to be easily aligned, and the decided state can also be maintained at the high-speed rotation of the motor.

In the aforementioned second and third embodiments, two simple and highly useful two methods are described, while the method for positioning the color wheel and the motor is not restricted to these. As long as the motor and the color wheel are previously aligned with each other, and at least one pulse per one revolution is output at a designated color switching from the Hall element which is provided inside the motor, any method can be used for positioning the color wheel and the motor, for example by aligning the color wheel and the motor by combining a pair of a bump and a dip, by combining numerous bumps and dips like a gear, or by using a clamper.

[Embodiment 4]

Hereinafter, a color wheel assembly according to the fourth embodiment of the present invention will be described with reference to FIG. 5.

Figure 5:
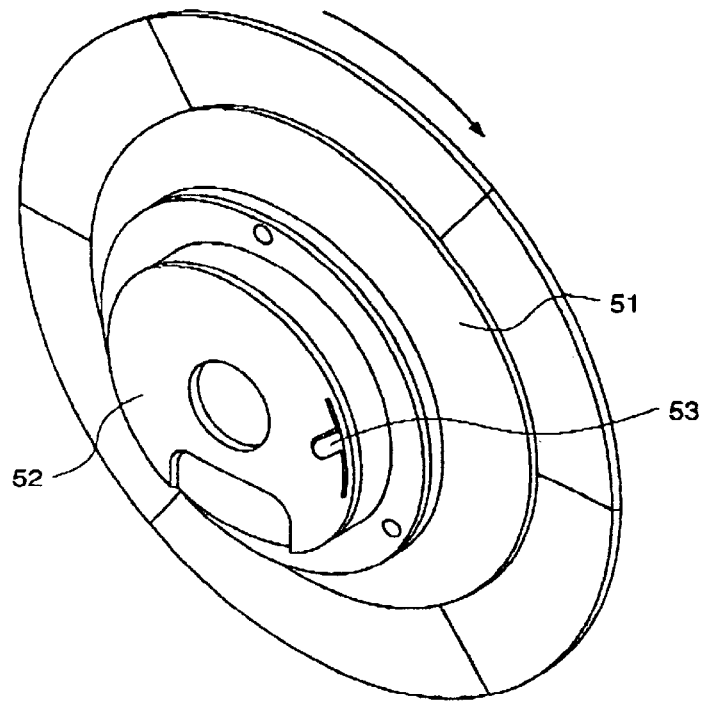
FIG. 5 is a diagram schematically illustrating an example of a color wheel assembly according to a fourth embodiment of the present invention.

FIG. 5 is a diagram schematically illustrating an example of the color wheel assembly of the fourth embodiment. The color wheel assembly of the fourth embodiment is different from the color wheel assembly of the first embodiment only in that it can shift a phase of a pulse signal which is mechanically output from the motor after the positioning of the color wheel and the motor, slightly forward or backward. The same reference numerals as those in the first embodiment denote the same or corresponding elements.

The color wheel assembly of the fourth embodiment is constituted by a color wheel 51 and a motor 52.

A back lever 53 of the motor 52, which is mounted on the color wheel 51, is direct-coupled to a sensor (not shown), and when the lever 53 is moved in parallel to the motor periphery, the sensor is similarly moved slightly. The rotational direction of the color wheel is shown by an arrow in the figure. When the lever 53 is moved slightly in the same direction as the rotational direction of the color wheel, the phase is shifted backward. When the lever 53 is moved slightly in the opposite direction to the rotational direction of the color wheel, the phase is shifted forward.

As described above, by providing the lever 53 for slightly moving the sensor which is provided inside the motor 52, even when the color switching of the filter and the positional relationship of the sensor are slightly deviated, resulting from an error in the processing precision of the color wheel 51 or the motor 52, this can be mechanically compensated.

[Embodiment 5]

Hereinafter, a field sequential color display device according to the fifth embodiment of the present invention will be described with reference to FIG. 6.

Figure 6:
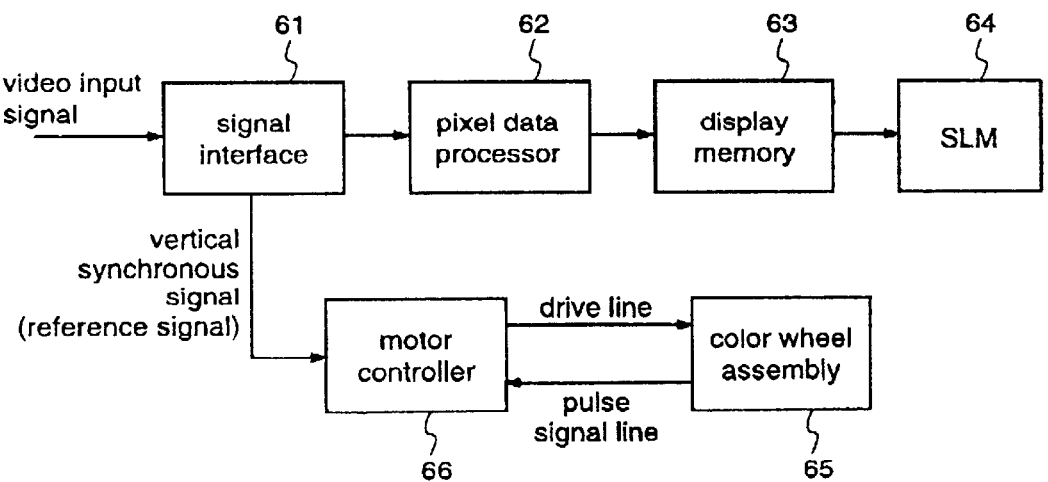
FIG. 6 is a block diagram illustrating a structure if a field sequential-color display device using a color wheel according to a fifth embodiment of the present invention.

FIG. 6 is a block diagram illustrating a structure of the field sequential color display device of the fifth embodiment.

As shown in FIG. 6, the field sequential color display device of the fifth embodiment comprises a signal interface 61, a pixel data processor 62, a display memory 63, a SLM 64, a color wheel assembly 65, and a motor controller 66.

The signal interface 61 can receive various types of input signals, and assume here that the input signal is a standard video signal having horizontal and vertical synchronous components. As described below, the vertical synchronous signal is used as a reference signal for adjusting the speed of the color wheel assembly 65. The input signal can be graphics data of a PC or the like, and the reference signal can be the one which is obtained from another signal source.

The pixel data processor 62 performs various processing tasks, thereby preparing data which are to be displayed on the SLM 64. The data processor includes a processing memory which stores data at the processing. The process which is performed by the data processor include degamma correction, color space conversion, and interlace interpolation. In the degamma correction, influences of gamma correction performed for broadcast signals are eliminated, and nonlinear movement of a CRT is compensated. In the color space conversion, the data are converted into RGB data. The interlace interpolation is used for converting an interface data field into a complete frame, by generating new data for meeting an odd or even line. These processes are carried out in any order.

The display memory 63 receives pixel data which have been processed by the data processor 62. The display memory 63 formats the data in a "bit-plane" format on the input or output, and supplies the bit-plane to the SLM 64. According to the bit-plane format, one bit is supplied at one time for each pixel of the SLM 64, and each pixel is turned on or off according to the bit value. For example, when each pixel is represented by 8 bits for each of three colors, a frame exists every 3×8 bit, i.e., 24-bit plane. In typical display systems, the memory is a double-buffer memory, which means that it has a capacity for at least two display frames. Data in a buffer for one display frame are read out to the SLM 64, while data are written into a buffer for another display frame. These two buffers are alternately controlled so that data are continuously read to the SLM 64.

The SLM 64 is a spatial light modulator, such as a LCOS and a DMD (Digital Micromirror Device).

The color wheel assembly 65 is the color wheel assembly described in any of the aforementioned first to fourth embodiments, and is constituted by a color wheel comprising plural color filters and a motor for rotating this color wheel. A sensor for detecting the rotation of the motor is contained by the motor, and one pulse is output per one motor revolution.

In this fifth embodiment, one pulse is output per one motor revolution, while the same effects can be obtained as long as at least one pulse is output per one motor revolution.

The motor controller 66 detects the rotation speed and position of the color wheel on the basis of the pulse signal which is output from the color wheel assembly 65, and outputs a drive signal to the motor of the color wheel assembly 65 so as to be synchronized with the reference signal (of predetermined rpm and phase) as the vertical synchronous signal which is output from the signal interface 61, thereby controlling the rotation speed and phase of the color wheel. For example, the rotation speed is controlled so that the number of revolutions of the motor becomes 60 revolutions per second, to correspond to the display speed of 60 frames per second. Further, the phase is controlled by accelerating or decelerating the speed of the motor of the color wheel assembly 65, so that light passing through the color wheel corresponds to data which are displayed by the SLM 64.

The operation of the so-constructed field sequential color display device is described.

White light emitted from a lamp such as a discharging-type high output lamp, for example, a xenon lamp, a metal halide lamp, or an extra-high pressure mercury lamp, which is positioned to condense light beams on the color wheel of the color wheel assembly 65 is sent to the SLM 64 through the color wheel of the color wheel assembly 65. The color wheel assembly 65 has a color wheel comprising red, blue and green color filters which are arranged in the form of a disk, and in synchronization with filtering of a light beam by each of the filters, the SLM 64 displays an image frame of the color of the beam. Normally, the color wheel of the color wheel assembly 65 is rotated by the motor one revolution per image frame in 1/60 sec, or at 3600 rpm. In this field sequential color display device, there are six sub-frames during one frame frequency, the respective being red, green, blue, red, green, and blue. The SLM 64 switches display images for the respective colors at a considerably high speed, and modulated respective color beams are enlargedly displayed on a screen using a projection lens. Videos of the respective colors R, G, B, R, G and B are successively displayed on the screen in 1/60 sec, so that these videos are perceived by the eyes as after-images, whereby full-color videos are recognized.

At this time, the color of the color wheel of the color wheel assembly 65 should be synchronized with the video displayed by the SLM 64. The process for synchronizing the color of the color wheel of the color wheel assembly 65 and the video displayed by the SLM 64 is carried out by the motor controller 66.

The motor controller 66 initially compares a reference phase and speed data as the reference signal which is output from the signal interface, with data which are obtained from a phase feedback signal and a speed feedback signal as the pulse signal which is output by the motor.

This comparison gives a phase error value or speed error value. Both of the error values indicate how much the duty cycle of the drive signal which has been subjected to the pulse width modulation should be extended or reduced to accelerate or decelerate the motor. In this fifth embodiment, the reference signal is a vertical synchronous signal of the standard television signal. The pulse is generated at a speed of about 60 fields per sec, which corresponds to the speed of 60 revolutions per sec of the color wheel. The synchronous pulse sets the phase, by giving a reference time, at which time a certain position on the color wheel should be at a certain point. It is desirable that the pulse signal which is output from the color wheel assembly 65 should match the reference pulse.

The rotation speed of the color wheel assembly 65 becomes approximately a desired speed during an initial motor start-up. Then, the speed error of the pulse signal which is output from the color wheel assembly 65 for each rotation is detected until the pulse signal matches the reference pulse for each rotation. Then, the phase is locked and while the phase is locked, an error between the index position and the reference position is detected.

As described above, the color wheel assembly 65 is driven and rotated by the motor, and the phase and the number of revolutions of the motor are controlled by the motor controller 66.

On the other hand, input data which have been input to the signal interface 61 are converted by the pixel data processor 62 into a signal format according to the time-multiplexed driving of the SLM. Further, the data are stored in the display memory, and output to the SLM at a predetermined timing.

As described above, when the color display is performed in a time-multiplexed and color sequential manner using the color wheel assembly described in any of the aforementioned first to fourth embodiments, the position of the color wheel can be detected only by the color wheel and the motor for rotating the color wheel.

Since the field sequential color display device can obtain a position detection signal stably also at highspeed rotation or at elevated temperatures, the process of synchronizing the color of the color filter on the color wheel with the video which is displayed by the SLM can be carried out accurately even at high-speed rotation or at elevated temperatures.

As examples of the field sequential color display device according to the fifth embodiment, there are, for examples a field sequential color display device using a projection lens and a direct-view-type field sequential color display device using an eyepiece.

[Embodiment 6]

Hereinafter, a color wheel unit according to the sixth embodiment of the present invention will be described with reference to FIGS. 7, 8 and 9.

Figure 7:
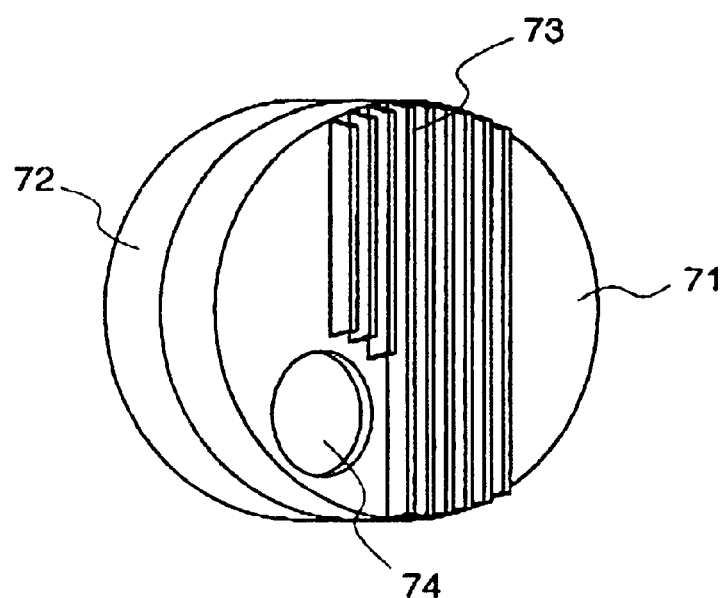
FIG. 7 is a diagram schematically illustrating an example of a color wheel unit according to a sixth embodiment of the present invention.

FIG. 7 is a diagram schematically illustrating the color wheel unit of the sixth embodiment. This color wheel unit is constituted mainly by a color wheel case lid 71, a color wheel case body 72, a color wheel (not shown), and a motor (not shown). A radiating fin part 73 and a light incident opening 74 are formed on the color wheel case lid 71. In order to simply describe the internal structure, a cross-sectional view of the color wheel unit according to the sixth embodiment is given in FIG. 8. Here, a color wheel assembly which is constituted by a color wheel 81 and a motor 82 for rotating the color wheel is the color wheel assembly described in any of the aforementioned first to fourth embodiments. The motor 82 is fixed to the color wheel case body 72, and the color wheel 81 is housed by the color wheel lid 71. As apparent from the cross-sectional view, the radiating fin part 73 is integrated with the color wheel case lid 71, and has plural narrow gather-shaped projections and depressions formed to efficiently dissipate heat which is conducted to the color wheel case, into the air.

Figure 9:
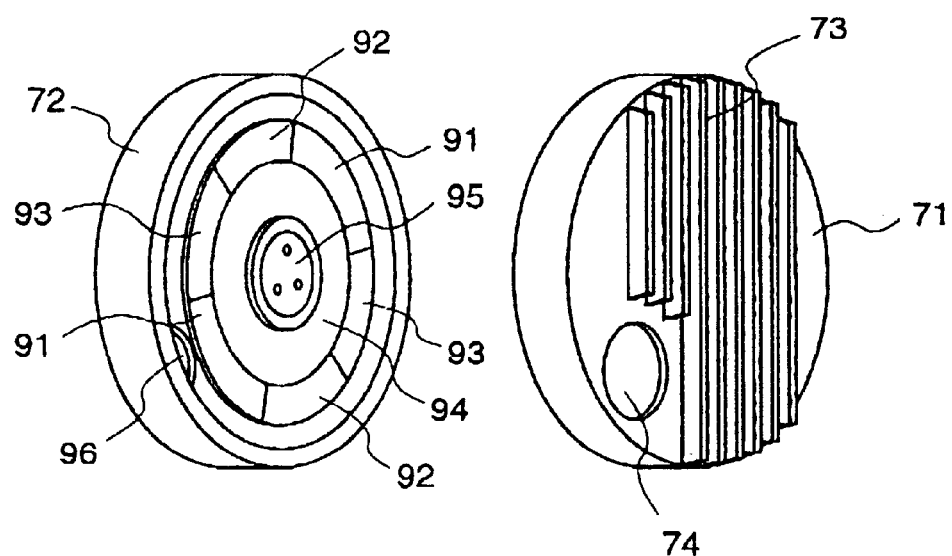
FIG. 9 is an exploded view illustrating an example of a color wheel unit according to an eighth embodiment of the present invention.

FIG. 9 is an exploded view schematically illustrating the color wheel unit, with the color wheel care lid 71 being removed. The color wheel comprises green (G), red (R) and blue (B) color filters 91, 92 and 93, which are sandwiched and fixed by two hubs 94 on opposing sides. Each of the color filters 91, 92 and 93 is a glass pane of 1-mm thickness, and the outside shape thereof is processed in an approximately fan shape having a 60-degree interior angle. The color filters 91, 92 and 93 each are a dichroic filter comprising a glass pane whose surface is coated by an optical thin film so that transmitted white light is modulated into light of the respective color R, G or B, and two filters for each color, i.e., six filters in total, are prepared. Each of the hubs 94 is made of aluminum has a disk shape, has an opening at its center, and the hubs 94 are joined by a rotor of the motor and a damper 95. The color filters 91, 92 and 93 are fixed by the hubs 94 in this way. Initially, the color filters 91, 92 and 93 are positioned on the hub so that the same color filters face each other across the center. Then, the other hub 94 is put on the color filters 91, 92 and 93, and fixed to the hub 94 with an adhesive or screws, whereby the color filters 91, 92 and 93 are sandwiched by the hubs 94.

The motor 82 is, for example, a ball bearing type DC brushless motor, and constituted mainly by a rotor part including a ball bearing, an axis, a coil, a magnet and the like, and a bracket part which covers the rotor part. A drive signal is received from outside the motor 82 through a lead or the like, thereby rotating the rotor part at a predetermined rpm. Naturally, the color wheel 81 which is joined with the rotor part rotate together.

When the color wheel is housed in the color wheel case as described above, the radiating fin part 73 having plural projections and depressions is provided on the color wheel case lid 71, whereby the color wheel case lid 71 has an increased surface area which is in contact with air, and higher heat radiation effects are realized. From the foregoing, increases in the temperature of the color wheel case can be prevented, whereby the reliability of the color wheel 81 and the motor 82 housed in the color wheel case can be increased.

Figure 8:
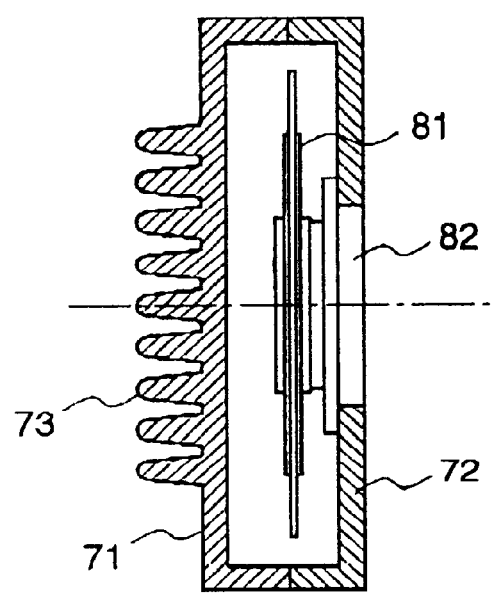
FIG. 8 is a cross-sectional view illustrating an example of a color wheel unit according to a seventh embodiment of the present invention.

In order to increase the heat radiation effects, it is preferable that cut-ups, bumps, grooves or the like are provided on the gather-shaped radiating fin part 73 as shown in FIG. 8, to further increase the surface area.

In addition, the color wheel case lid 71, the color wheel case body 72 and the radiating fin part 73 are preferably made of high thermal conductivity metals such as brass, aluminum and copper, and it is preferable that its surface is a reflecting surface which hardly absorbs unnecessary light.

In the present invention, the shape of the case is all columnar, while it is needless to say that the case can have other shapes such as a rectangular parallelepiped, a spherical shape, and a conical shape.

In the sixth embodiment, the side of the color wheel case lid 71 is the light incident side. However, the reason of this is that loads imposed on the motor in terms of heat are favorably smaller, and therefore the spirit of the present invention is not changed even when the side of the color wheel case lid 71 is the light radiating side.

[Embodiment 7]

Hereinafter, a color wheel unit according to a seventh embodiment of the present invention will be described with reference to FIG. 10.

Figure 10:
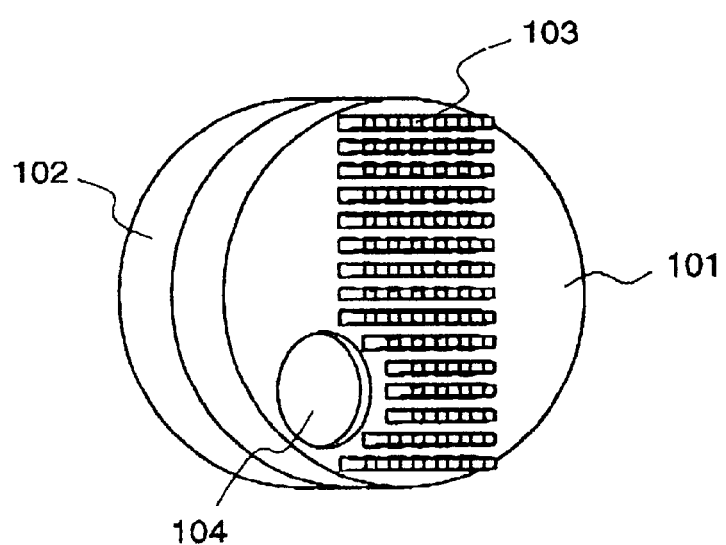
FIG. 10 is a diagram schematically illustrating an example of a color wheel unit according to a ninth embodiment of the present invention.

FIG. 10 is a diagram schematically illustrating the color wheel unit of the seventh embodiment. As shown in FIG. 10, a radiating fin part 103 and a light incident opening 104 are formed on a color wheel case lid 101. Though not shown, a color wheel and a motor are fixed to a color wheel case body 102, and housed in the case. The radiating fin part of the color wheel unit according to the sixth embodiment is the one having plural gather-shaped projections and depressions, while the radiating fin part 103 of the seventh embodiment has plural columnar projections and depressions formed as shown in FIG. 10, thereby having higher heat radiation effects.

[Embodiment 8]

Figure 11:
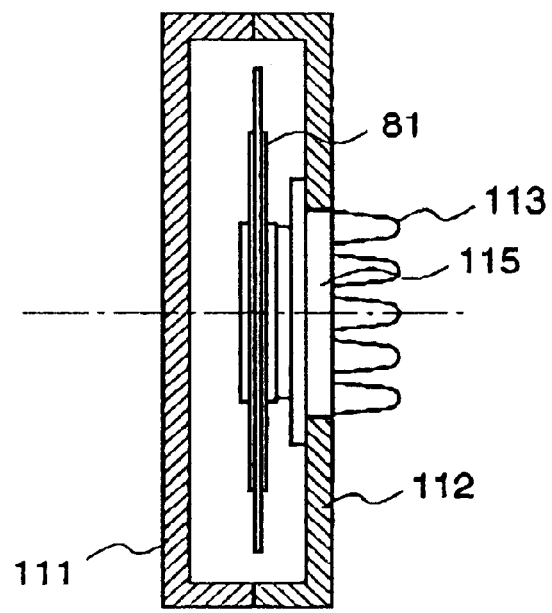
FIG. 11 is a cross-sectional view illustrating an example of a color wheel unit according to a tenth embodiment of the present invention.

Hereinafter, a color wheel unit according to the eighth embodiment of the present invention will be described with reference to FIG. 11. FIG. 11 is a cross-sectional view illustrating the color wheel unit of the eighth embodiment. As shown in FIG. 11, a color wheel 81 and a motor 115 are housed by a color wheel case lid 111 and a color wheel case body 112. The motor 115 is fixed to the color wheel case body 112, and a radiating fin part 113 is formed on a bracket part which is exposed outside. This radiating fin part 113 is integrated with the bracket part of the motor 115, and has plural narrow gather-shaped projections and depressions formed to efficiently dissipate heat which is conducted to the color wheel 81 and the motor 115, into air. Especially; when the motor 115 has a bearing, a metal or oil bearing type, grease or oil is used on the shaft surface to reduce friction at the rotation, and the volatilization or deterioration thereof is serious at elevated temperatures, whereby the reliability of the motor is considerably harmed. In the color wheel unit of the eighth embodiment, to effectively suppress the deterioration of the motor, a radiating means having plural projections and depressions is provided on the outer surface of the motor, thereby realizing higher heat radiation effects.

The radiating fin part 113 shown in FIG. 11 can be a radiating fin part having columnar projections and depressions as shown in FIG. 10. In addition, the motor 115 contains a sensor for detecting the rotation of the motor, and outputs one pulse per one motor revolution, like the motor described in any of the aforementioned first to fourth embodiments.

[Embodiment 9]

Figure 12:
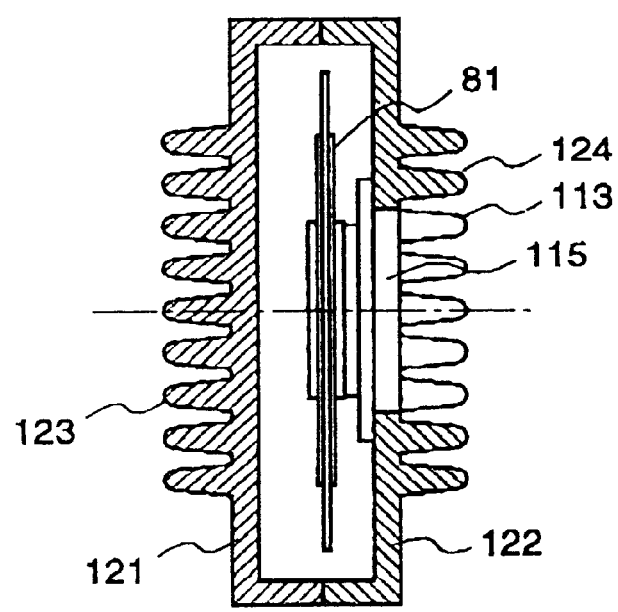
FIG. 12 is a cross-sectional view illustrating an example of a color wheel unit according to an eleventh embodiment of the present invention.

Hereinafter, a color wheel unit according to the ninth embodiment of the present invention will be described with reference to FIG. 12. FIG. 12 is a cross-sectional view illustrating the color wheel unit of the ninth embodiment. As shown in FIG. 12, a color wheel 81 and a motor 115 are housed by a color wheel case lid 121 and a color wheel case body 122. The motor 115 is fixed to the color wheel case body 122, and a radiating fin part 113 is formed on a bracket part which is exposed outside. The radiating fin part 113 is integrated with the bracket part of the motor 115, and has plural narrow gather-shaped projections and depressions formed thereon to effectively dissipate head which is conducted to the color wheel 81 and the motor 115, into the air. Further, radiating fin parts 123 and 124 are formed on the color wheel case lid 121 and the color wheel case body 122, respectively, whereby the heat radiation effects are increased in the entire color wheel.

[Embodiment 10]

Figure 13:
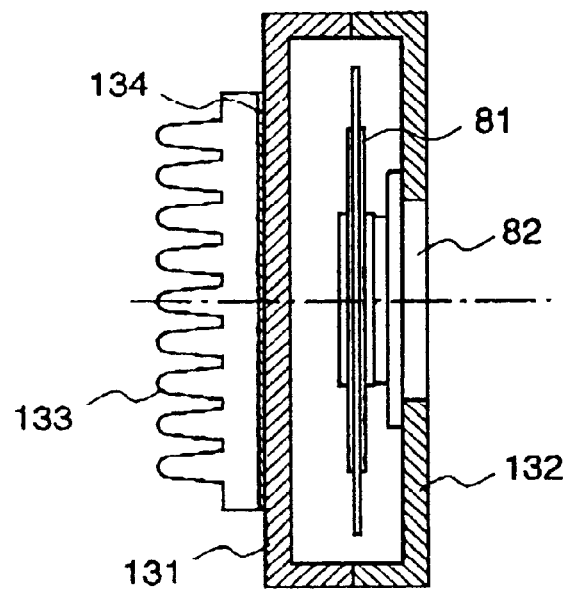
FIG. 13 is a cross-sectional view illustrating an example of a color wheel unit according to a twelfth embodiment of the present invention.

Hereinafter, a color wheel unit according to the tenth embodiment of the present invention will be described with reference to FIG. 13. FIG. 13 is a cross-sectional view illustrating the color wheel unit of the tenth embodiment. As shown in FIG. 13, a color wheel 81 and a motor 82 are housed by a color wheel case lid 131 and a color wheel case body 132. The motor 82 is fixed to the color wheel case body 132, and a radiating fin part 133 is bonded on the outer surface of the color wheel case lid 131 through thermal conducting grease 134. The heat radiation effects thereof are slightly inferior to those of the radiating fin part 73 which is integrated with the color wheel case lid 71 shown in FIG. 8, but this radiating fin part 133 can be easily removed.

This radiating fin part 133 can be bonded to an outer surface of the color wheel case body 132 and an outer exposed part of the motor 82. The larger the surface area is, the higher the heat radiation effects are.

[Embodiment 11]

Figure 14:
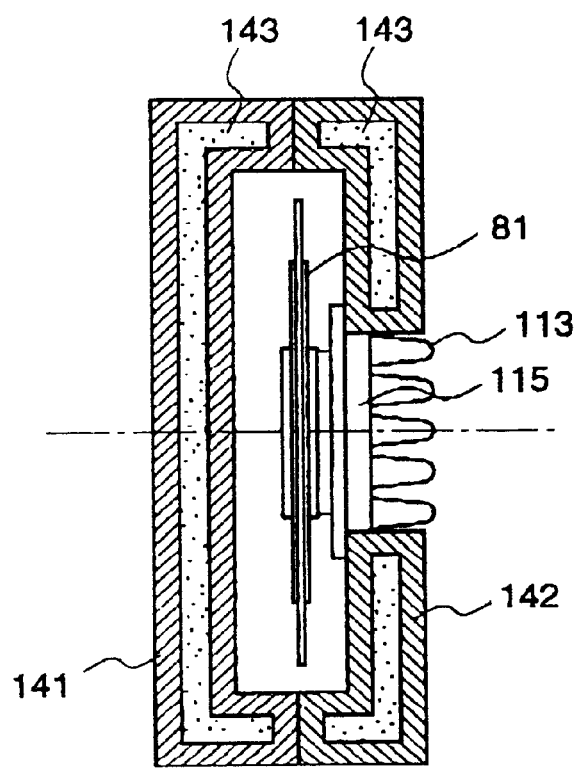
FIG. 14 is a cross-sectional view illustrating an example of a color wheel unit according to a thirteenth embodiment of the present invention.

Hereinafter, a color wheel unit according to the eleventh embodiment of the present invention will be described with reference to FIG. 14. FIG. 14 is a cross-sectional view illustrating the color wheel unit according to the eleventh embodiment. As shown in FIG. 14, a color wheel 81 and a motor 115 are housed by a color wheel case lid 141 and a color wheel case body 142. The motor 115 is fixed to the color wheel case body 142, and a radiating fin part 113 is formed on a bracket part which is exposed outside. This radiating fin part 113 is integrated with the bracket part of the motor 115, and has plural narrow gather-shaped projections and depressions formed to efficiently dissipate heat which is conducted to the color wheel 81 and the motor 115, into air. The color wheel case lid 141 and the color wheel case body 142 each has a hollow structure, in which a coolant 143 is sealed. In this eleventh embodiment, an ethylene glycol solution is used as the coolant 143. The coolant which has taken heat in the vicinity of the light incident opening or light radiating opening where increases in the temperature are especially substantial is circulated by natural convection, whereby the temperatures of the color wheel case lid 141 and the body 142 are homogenized, and heat is dissipated from the entire surface into air, to cool the color wheel unit. Since it is difficult to circulate the coolant in the vicinity of the motor 115 and the color wheel 81, the radiating fin part 113 on the exposed bracket part of the motor 115 efficiently dissipates heat into the air. It goes without saying that the cooling effects are further increased by using the radiating fin parts having plural projections and depressions together, which are provided on the outer surfaces of the color wheel case lid 141 and the color wheel case body 142 as shown in the above-mentioned examples.

[Embodiment 12]

Figure 15:
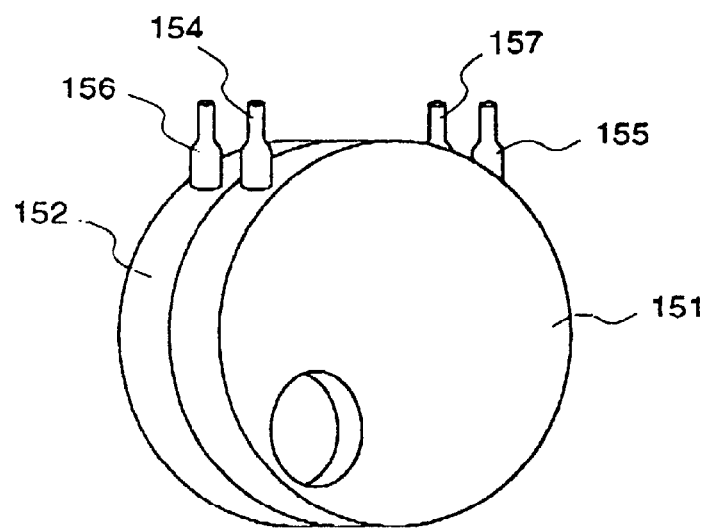
FIG. 15 is a diagram schematically illustrating an example of a color wheel unit according to a fourteenth embodiment of the present invention.

Hereinafter, a color wheel unit according to the twelfth embodiment of the present invention will be described with reference to FIG. 15. FIG. 15 is a diagram schematically illustrating the color wheel unit of the twelfth embodiment. A cross section of the color wheel unit is almost the same as that shown in FIG. 14, and a color wheel case lid 151 and a color wheel case body 152 each have a hollow structure, in which a coolant is sealed. Further, in this embodiment, this coolant is injected to the color wheel case lid 151 and the color wheel case body 152 through coolant inlets 154 and 156, respectively, circulated in the case, and discharged to the outside through the coolant outlets 155 and 157, respectively. During this time, the coolant takes heat of light beams which has been absorbed by the color wheel case lid 151 and the color wheel case body 152, thereby cooling the color wheel unit. Though not shown, the coolant which has taken the heat and been warmed are discharged through the coolant outlets 151 and 157, then naturally or forcefully cooled, and thereafter injected again into the color wheel case lid 151 and the color wheel case body 152 through the coolant inlets 154 and 156, respectively, and circulated to cool the color wheel unit. The mounted positions, the shapes, and the number of the coolant inlets 154 and 156 and the coolant outlet 155 and 157 are not restricted to those shown in FIG. 15.

[Embodiment 13]

Figure 16:
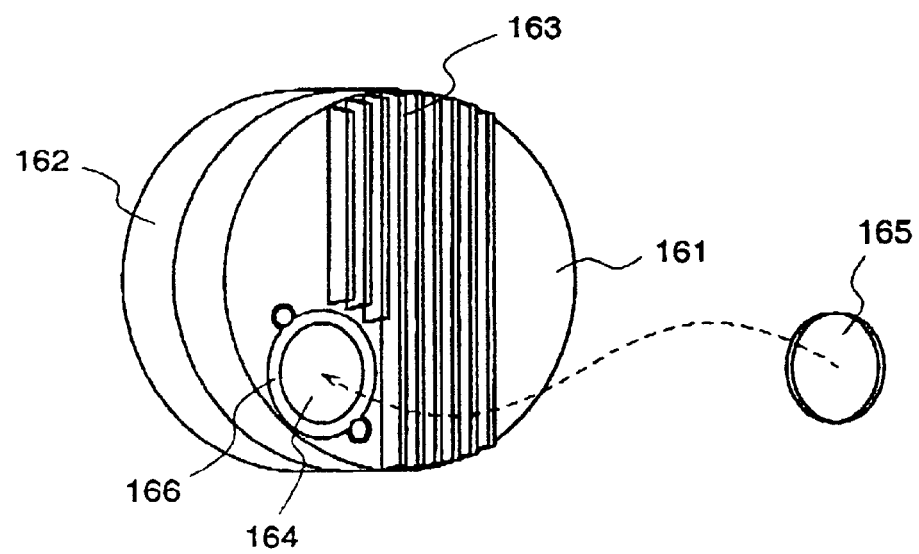
FIG. 16 is a diagram schematically illustrating an example of a color wheel unit according to a fifteenth embodiment of the present invention.

Hereinafter, a color wheel unit according to the thirteenth embodiment of the present invention will be described with reference to FIG. 16. FIG. 16 is a diagram schematically illustrating the color wheel unit of the thirteenth embodiment. As shown in FIG. 16, a radiating fin part 163 and a light incident opening 164 are formed on a color wheel case lid 161. Though not shown, a color wheel and a motor are fixed to a color wheel case body 162, and housed in the case. A circular transparent plate 165 is mounted to seal the light incident opening 164, and fixed by a keep plate 166. Even when the color wheel and the motor are housed in the case, at least an opening into or from which light beams enter or emerge is required. When this opening is left open, problems of a risk that broken glass caused by breakage of the color filters scatters in the device or a reduced display luminance caused by dust or dirt attracted by charged glass, cannot be sufficiently solved. Further, since the internal pressure is changed resulting from the high-speed rotation of the color wheel in the case, a large quantity of air is injected into or discharged from this opening. Noise which is caused by self-excitation vibrations of air at this time are quite large. Especially, when the size of the light incident opening is reduced, the noise caused by the injection or discharge of air tend to be loud. Therefore, in this embodiment, the light incident opening 164 is sealed with the transparent plate 165 having the same shape as the opening 164, whereby the light beams are transmitted while the air flow is intercepted to suppress the noise. The keep plate 166 is open in an area where the beams are transmitted through, and is provided to fix the transparent plate 165 to the color wheel case lid 161. When the transparent plate 165 is bonded with a heat-resistant adhesive, for examples one-liquid silicone resin adhesive, the keep plate 166 can be dispensed with. Further, though not shown in FIG. 16, the light radiating opening should be similarly sealed with a transparent plate. In this case, the sealing of the color wheel case can be significantly increased, while on the contrary, the cooling becomes more difficult. Therefore, by forming the radiating fin part 163 on the outer surface of the color wheel case lid 161, heat in the case is more effectively dissipated to cool the case.

In a case where the transparent plate 165 shown in FIG. 16 is a glass pane, reflection of light occurs on an interface between air and glass, resulting in about a 4% of lost of light. Since one glass pane has two interfaces, this results in about 15% reduction in the brightness in total, summing up reductions on the light incident side and the light radiating side. In this embodiment, the loss in the brightness can be controlled to about 2% or less, by covering both sides of the transparent plate 165 on which light is incident, with a reflection-inhibiting coating. Since the beams entering into or emerging from the transparent plate 165 are white light beams, it is preferable that the reflection-inhibiting coating is a multi-coating comprising plural laminated optical thin films which are obtained by evaporating a metal oxide. This certainly holds true for a transparent plate which is used for the light radiating opening (not shown).

In addition, when a glass plate which is coated with an ultraviolet-reflecting film at least one side thereof is used as the transparent plate 165 which is to be used for the light incident opening 164, harmful ultraviolet rays can be eliminated before reaching the color wheel. Further, the adhesive which is used for fixing the color filters to the hub can be prevented from being deteriorated by ultraviolet rays, whereby an increased reliability of the color wheel is expected.

In addition, by using a ultraviolet-absorbing glass pane as the transparent plate 165 which is to be used for the light incident opening 164, the harmful ultraviolet rays can also be eliminated before reaching the color wheel. Since beams which are gathered directly from the lamp reach the color wheel, beams having large incident angles are transmitted through the transparent plate 165. Because the ultraviolet-absorbing film has a dependence on the incident angle, ultraviolet rays having larger incident angles are hardly reflected. On the other hand, since the ultraviolet-absorbing glass does not have a dependence on the incident angle, a satisfactory elimination of the ultraviolet rays is enabled. Accordingly, the adhesive can be prevented from being deteriorated by the ultraviolet rays, whereby an increased reliability of the color wheel is expected. It is preferable to use the ultraviolet-absorbing glass as the transparent plate 165 and the ultraviolet-reflecting film on the light incident side.

Further, when a glass pane which is coated with a infrared-reflecting film at least one side thereof is used as the transparent plate 165 which is to be used for the light incident opening 164, infrared rays can be eliminated before reaching the color wheel. By reducing the infrared rays which are reflected from the color filters, increases in the temperature of the color wheel case can be previously prevented, whereby an increased reliability of the color wheel is expected.

Further, harmful infrared rays can also be eliminated before reaching the color wheel by using an infrared-absorbing glass pane as the transparent plate 165 which is to be used for the 7 light incident opening 164. Since beams which are gathered directly from the lamp reach the color wheel, beams having larger incident angles are transmitted through the transparent plate 165. At that time, because the infrared-reflecting film has a dependence on the incident angle, the infrared rays having larger incident angles are hardly reflected. On the other hand, since the infrared-absorbing glass does not have a dependence on the incident angle, a satisfactory elimination of the infrared rays is enabled. Accordingly, increases in the temperature can be suppressed, whereby an increased reliability of the color wheel is expected. It is preferable to use the infrared-absorbing glass as the transparent plate 165 and form the infrared-reflecting film on the light incident side.

[Embodiment 14]

Figure 17:
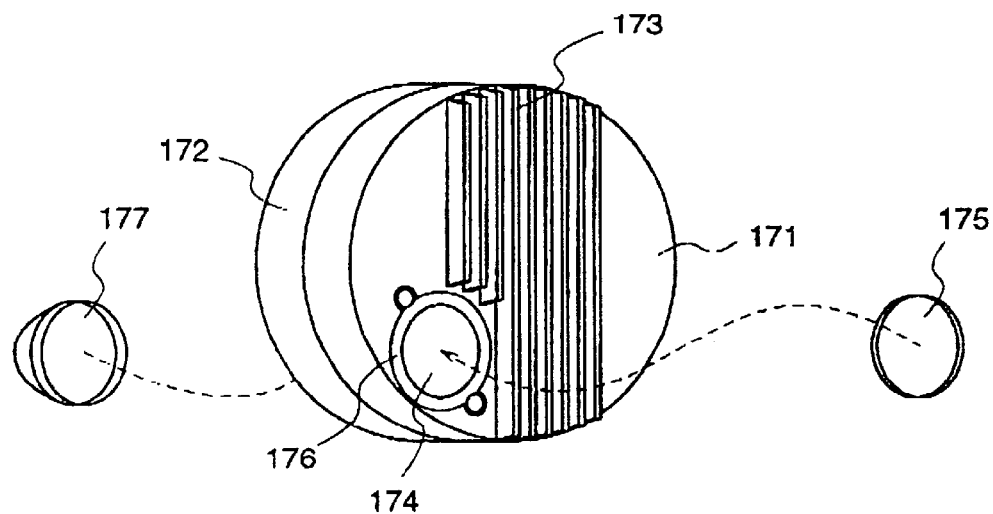
FIG. 17 is a diagram schematically illustrating an example of a color wheel unit according to a sixteenth embodiment of the present invention.

Hereinafter, a color wheel unit according to the fourteenth embodiment of the present invention will be described with reference to FIG. 17. FIG. 17 is a diagram schematically illustrating the color wheel unit of the fourteenth embodiment. As shown in FIG. 17, a radiating fin part 173 and a light incident opening 174 are formed on a color wheel case lid 171. Though not shown, a color wheel and a motor are fixed to the color wheel case body 172, and housed in the case. A circular transparent plate 175 is mounted to seal the light incident opening 174, and fixed by a keep plate 176. On the other hand, a transparent lens 177 is mounted to seal a light radiating opening (not shown), and fixed by a keep plate. The same effects as those of the color wheel unit according to the thirteenth embodiment as shown in FIG. 16 can be obtained in this embodiment, while unnecessary optical components can be reduced, by using not the transparent plate, but the transparent lens 177 especially on the light radiating opening. The beams emitted from the lamp are gathered and then reach the color wheel. The beams which have been subjected to the color separation by the color wheel emerge spreading out. It is essential to parallelize or condense these spreading beams in a later optical system and use the same, thereby increasing the light utilization efficiency. In this embodiment, an optical design is made such that this condensing lens is positioned immediately behind the light radiating opening of the color wheel case, and this transparent lens 177 is used for sealing the light radiating opening of the color wheel case. Accordingly, a considerably high sealing of the color wheel case can be obtained, as well as reducing the number of the optical components. On the other hand, the cooling is made more difficult, and increases in the temperature due to heat become substantial. However, by forming the radiating fin part 173 on the outer surface of the color wheel case lid 171, heat in the case can be dissipated more effectively, thereby cooling the inside of the case.

[Embodiment 15]

Figure 18:
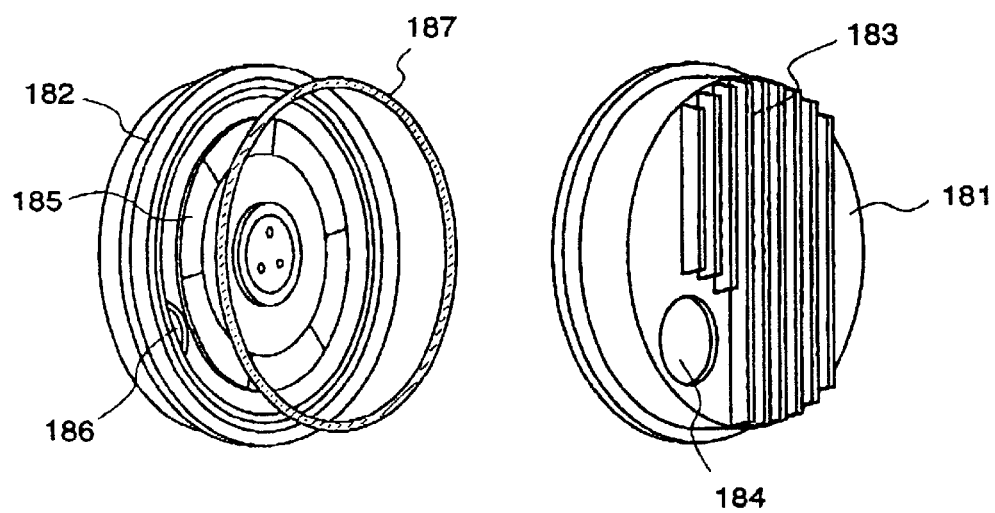
FIG. 18 is a diagram schematically illustrating an example of a color wheel according to a seventeenth embodiment of the present invention.

Hereinafter, a color wheel unit according to the fifteenth embodiment of the present invention will be described with reference to FIG. 18. FIG. 18 is a diagram schematically illustrating the color wheel unit of the fifteenth embodiment. As shown in FIG. 18, a radiating fin part 183 and a light incident opening 184 are formed on a color wheel case lid 181. A light radiating opening 186 is formed on a color wheel case body 182. A color wheel 185 and a motor (not shown) are fixed to the color wheel case body 182, and housed in the case with covered by the color wheel case lid 181. The color wheel case lid 181 and the color wheel case body 182 are bonded together after the color wheel 185 and the motor are fixed to the color wheel case body 182. At that time, to prevent the color wheel case lid 181 from being in direct contact with the color wheel case body 182 as well as prevent a crevice from being formed, an O-ring 187 as a cushioning material is inserted at the junction between the color wheel case lid 181 and the color wheel case body 182. Thereby, an increased sealing of the color wheel case can be obtained, and even when light which has been absorbed by the color wheel case lid 181 is converted into heat, this heat is hardly conducted to the color wheel case body 182 because the thermal conductivity of rubber or resin of the O-ring is lower than that of metal. Therefore, the conduction of heat to the motor or color wheel which is fixed to the color wheel body 182 can be suppressed, whereby the reliability of the color wheel and the motor can be increased. In addition, by forming the radiating fin part 183 on the outer surface of the color wheel case lid 181, the heat in the case can be dissipated more effectively, thereby cooling the case. Further, since vibrations caused by the rotations of the color wheel and the motor are absorbed by the O-ring 187, noises which are caused by the vibrations at the junction between the color wheel case lid 181 and the color wheel case body 182 can be reduced.

[Embodiment 16]

Figure 19:
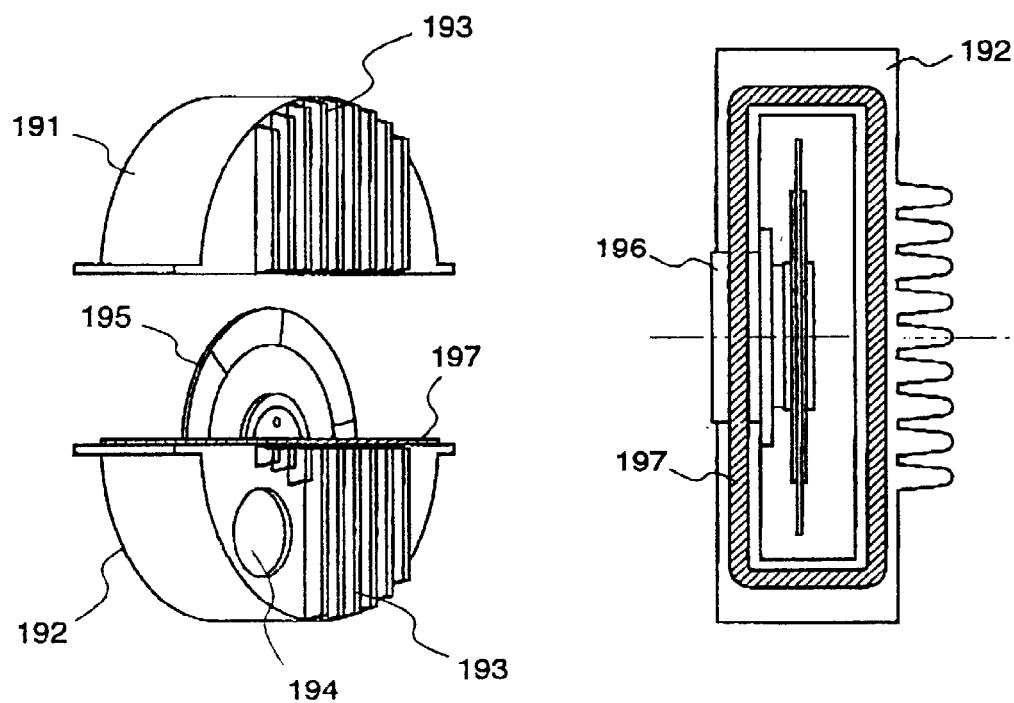
FIG. 19 is a schematic diagram and a cross-sectional view illustrating an example of a color wheel according to an eighteenth embodiment of the present invention.

Hereinafter, a color wheel unit according to the sixteenth embodiment of the present invention will be described with reference to FIG. 19. FIG. 19 is a schematic diagram and a cross-sectional view illustrating the color wheel unit of the sixteenth embodiment. In this sixteenth embodiment, a dividing manner of the color wheel case is different from that described in any of the aforementioned embodiments. As shown in FIG. 19, the color wheel case lid 191 and the, color wheel case body 192 are divided a the direction of a diameter of the color wheel. A radiating f in part 193 is formed on the color wheel case lid 191, and the radiating fin part 193, a light incident opening 194 and a light radiating opening (not shown) are formed on the color wheel case body 192. A color wheel 195 and a motor 196 are fixed to the color wheel case body 192, and housed in the case, covered by the color wheel case lid 191. The color wheel case lid 191 is kept from direct contact with the color wheel case body 192, and an O-ring 197 as a cushioning material is inserted at the junction between the color wheel case lid 191 and the color wheel case body 192 to prevent a crevice from being formed. Thereby, a better sealing of the color wheel case can be obtained. In addition, by forming the radiating fin part 193 on the outer surface of the color wheel case lid 191, heat in the case can be dissipated more effectively to cool the inside of the case. Further, since the O-ring 197 absorbs vibrations caused by the rotations of the color wheel and the motor, noises resulting from vibrations at the junction of the color wheel case lid 191 and the color wheel case body 192 can be reduced.

[Embodiment 17]

Figure 20:
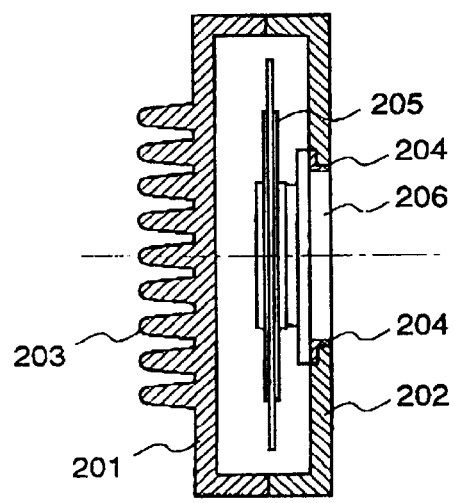
FIG. 20 is a cross-sectional view illustrating an example of a color wheel according to a nineteenth embodiment of the present invention.

Hereinafter, a color wheel unit according to the seventeenth embodiment of the present invention will be described with reference to FIG. 20. FIG. 20 is a cross-sectional view illustrating the color wheel unit of the seventeenth embodiment. As shown in FIG. 20, a radiating fin part 203 is formed on a color wheel case lid 210. A color wheel 205 and a motor 206 are fixed to the color wheel case body 202, and housed in the case. A cushioning material 204 is put between joint surfaces of the color wheel case body 202 and the motor 206, and fixed so that the color wheel case body 202 is kept from a direct contact with the motor 206 as well as to ensure that no crevice is formed therebetween. Thereby, an increased sealing of the color wheel case can be obtained, and even when light which has been absorbed by the color wheel case lid 201 and the color wheel case body 202 is converted into heat, this heat is hardly conducted to the motor 206 because the thermal conductivity of rubber or resin as the cushioning material is lower than that of metal. Therefore, the conduction of heat to the motor or color wheel can be suppressed, thereby increasing the reliability. In addition, by forming the radiating fin part 203 on the outer surface of the color wheel case lid 201, the heat in the case can be dissipated more effectively, thereby cooling the inside of the case. Further, since the cushioning material 204 absorbs vibrations resulting from the rotations of the color wheel and the motor, noises caused by vibrations at the junction between the motor 206 and the color wheel case body 202 can be reduced.

[Embodiment 18]

Figure 21:
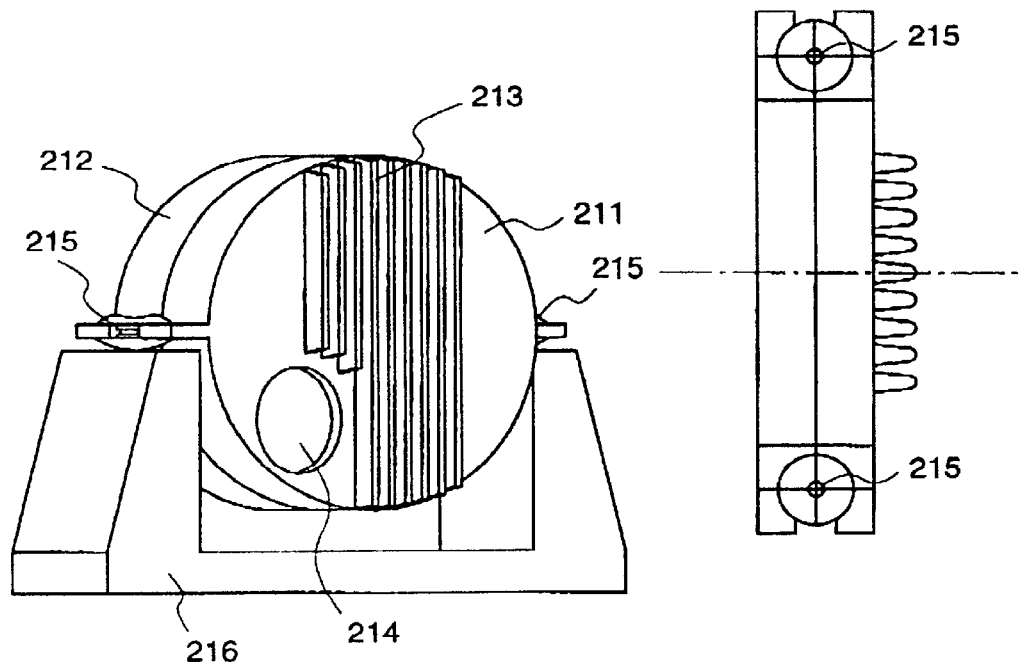
FIG. 21 is a diagram schematically illustrating an example of a color wheel according to a twentieth embodiment of the present invention.

A color wheel unit according to the eighteenth embodiment of the present invention will be described with reference to FIG. 21. FIG. 21 is a diagram schematically illustrating the color wheel unit of the eighteenth embodiment. As shown in FIG. 21, a radiating f in part 213 is formed on a color wheel case lid 211. A color wheel and a motor are fixed to a color wheel case body 212, and housed in the case. Two fixing parts for fixing the color wheel unit to an optical chassis 216 are provided on the color wheel case. A cushioning material 215 is inserted at the fixing parts, and the color wheel unit is fixed to the optical chassis 216, while being kept from direct contact therewith. The cushioning material 215 is made of a vibration-isolating rubber damper. Thereby, vibrations resulting from the rotations of the color wheel and the motor are absorbed or intercepted by the cushioning material 215, whereby noises caused by the vibrations at the junction between the color wheel unit and the optical chassis are reduced, and the vibrations of the color wheel unit are not conducted to the optical chassis. Further, when the color wheel unit can be easily removed from the optical chassis 216 like in this embodiment, the color wheel unit can be immediately replaced and the maintenance can be easily performed if the color wheel should be broken or the motor should fail.

[Embodiment 19]

Figure 22:
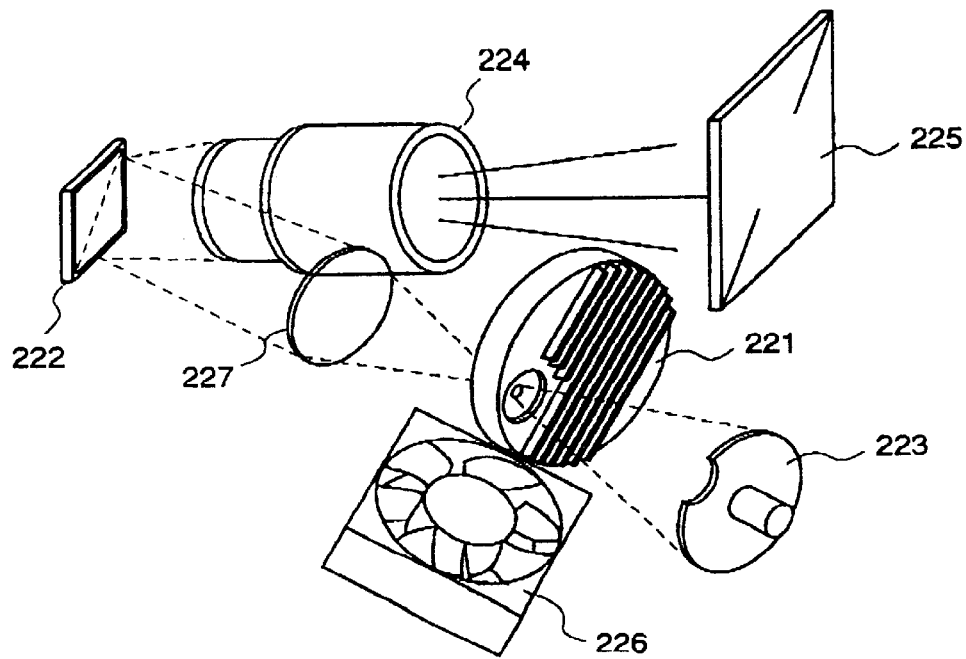
FIG. 22 is a diagram illustrating a structure of a field sequential color display device according to a twenty-first embodiment of the present invention.

Hereinafter, a field sequential color display device according to the nineteenth embodiment of the present invention will be described with reference to FIG. 22. FIG. 22 is a diagram illustrating a structure of the field sequential color display device of the nineteenth embodiment. As shown in FIG. 22, this field sequential color display device comprises a color wheel unit 221, a LCOS 222, a lamp 223, a projection lens 224, a screen 225, a cooling fan 226, and a field lens 227.

The color wheel unit 221 is the color wheel unit described in any of the seventh to eighteenth embodiments.

The LCOS 222 is one of the SLMs; and it comprises reflection pixels in the form of a matrix formed on a silicon substrate and can switch displays at a high speed using a video signal.

The operation of the so-constructed field sequential color display device is described. A 250 W extra-high pressure mercury lamp is used as the lamp 223. The lamp 223 is positioned approximately in a focus point of a concave mirror, and white light beams emitted from the lamp are condensed by the elliptical concave mirror on the color filter of the color wheel. In this lamp, the luminance of the emission part is high, and emitted light beams can be efficiently condensed, Further, this lamp has good color rendering properties, and this is suitable for full-color displays. The color wheel comprises green, red, and blue color filters, which are positioned in the form of a disk. In synchronization with filtering of a beam by each filter, the LCOS 222 displays an image frame of the color of the beam. In the field sequential color display device according to the nineteenth embodiment, the color wheel is rotated by the motor two revolutions per image frame in 1/60 sec, or at 7200 rpm. In this field sequential color display device, there are twelve color sub-frames during one frame frequency, the respective being green, red, blue, green, red, blue, green, red, blue, green, red, and blue. The LCOS 222 switches the display images for the respective colors at a considerably high speed, and modulated beams of respective colors are enlargedly projected on the screen 225 using the projection lens 224. Since videos of the respective colors G, R, B, G, R, B, G, R, B, G, R, and B are successively displayed on the screen in 1/60 sec, these videos are perceived by the eyes being integrated as after-images, whereby full-color videos are recognized.

The color wheel and the motor rotate at a considerably high speed inside the color wheel unit 221, and the color wheel unit 221 is irradiated with beams emitted from the lamp 223 so that the beams are condensed on the color wheel. The concave mirror of the lamp 223 is an ellipsoidal mirror, and just over 70% of the beams are reflected from the concave mirror and condensed on the color wheel. However, nearly 30% of the beams are not emitted toward the direction of the concave mirror, and these beams are emitted spreading out from the front surface of the concave mirror, whereby the color wheel unit 221 is directly radiated with these beams. Further, the beams which are reflected from the concave mirror and condensed are absorbed by the color wheel case on the periphery of the opening, when these beams pass through the light incident opening of the color wheel unit 221. Further, beams which have been subjected to color separation and reflected from the color filters of the color wheel return toward the lamp, and there are some beams which are absorbed inside the color wheel case. As described above, the beams which are absorbed by the color wheel case are all converted into heat, resulting in an increase in the temperature of the color wheel unit. Further, since the lamp itself reaches a considerably high temperature, the temperature of the color wheel unit 221 which is positioned in the vicinity of the lamp is also increased by the radiation heat. When the color wheel unit 221 which is under these thermally harsh conditions is to be cooled, the radiating fin part formed on the color wheel case or the motor is cooled by the cooling fan 226. Thereby, not only the color wheel case, but also the color wheel and the motor which are sealed inside the case can be sufficiently cooled. When the direction that the air is blown at that time is the same as the orientation of the radiating fin part of the color wheel unit, higher effects can be obtained.

In this nineteenth embodiment, a projection-type display using the projection lens is used as the field sequential color display device, while a direct-view-type field sequential color display device using an eyepiece in place of the projection lens can be used.

[Embodiment 20]

Figure 23:
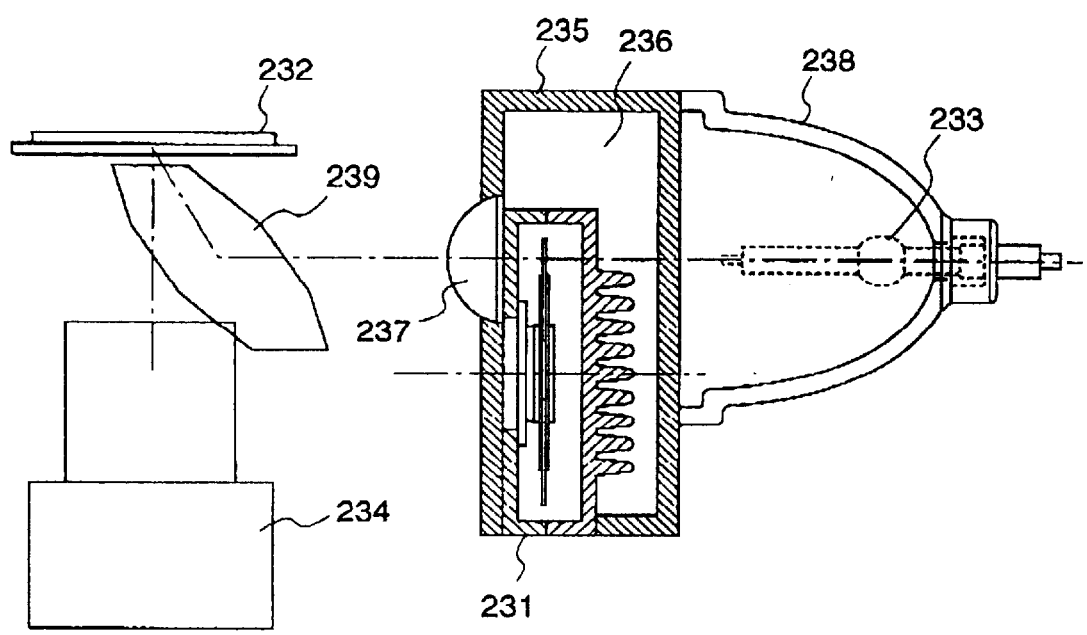
FIG. 23 is a diagram illustrating a structure of a field sequential color display device according to a twenty-second embodiment of the present invention.

Hereinafter, a field sequential color display device according to the twentieth embodiment of the present invention will be described with reference to FIG. 23. FIG. 23 is a diagram illustrating a structure of the field sequential color display device of the twentieth embodiment. As shown in FIG. 23, the field sequential color display device comprises a color wheel unit 231, a DMD 232, a lamp 233, a projection lens 234, a cooling unit 235, and a field lens 237.

The color wheel unit 231 is the color wheel unit described in any of the seventh to eighteenth embodiments.

The DMD 232 is one of the SLMs, which is a cluster of minute mirrors, and the inclination angle of each mirror can be changed by a signal to switch the display on or off at a considerably high speed.

The operation of the so-constructed field sequential color display device is described. A 150 W extra-high pressure mercury lamp is used as the lamp 233. The lamp 233 is positioned approximately in a focus point of a concave mirror 238, so that white light beams which are emitted from the lamp are condensed on the color filter of the color wheel by the elliptical concave mirror 238. The color wheel is constituted by green, red, and blue color filters, which are positioned in the form of a disk. In synchronization with filtering of the beam by each filter, the DMD 232 displays an image frame of the color of the beam. In the field sequential color display device according to the twentieth embodiment, the color wheel is rotated by a motor three revolutions per image frame in 1/60 sec or at 10800 rpm. In this field sequential color display device, there are 18 sub-frames during one frame frequency, the respective being green, red, blue, green, red, blue, green, red, blue, green, red, blue, green, red, blue, green, red, and blue. The DMD 232 switches display images for the respective colors at a considerably high speed, and modulated beams of respective colors are enlargedly projected on the screen using the projection lens 234. Since videos of the respective colors G, R, B, G, R, B, G, R, B, G, R, B, G, R, B, G, R and B are successively displayed on the screen in 1/60 sec, these videos are perceived by the eyes as being integrated as after-images, whereby full-color videos are recognized. The beams which have been subjected to the color separation by the color wheel are made to be parallel beams by the field lens 237, and illuminate the DMD 232 obliquely with the mirror 239. In this field sequential color display device, the direction of the reflected beam is controlled according to the inclination of the mirror with respect to the DMD 232, and it is previously designed so that the beam is incident on the projection lens 234 when it is ON.

The color wheel and the motor rotate at a considerably high speed inside the motor wheel unit 231, and the color wheel unit 231 is irradiated with the beams emitted from the lamp 233 so that the beams are condensed on the color wheel. The cooling unit 235 is positioned in a space between the concave mirror 238 of the lamp 233 and the field lens 237, and filled with a coolant 236. The color wheel unit 231 is positioned to be immersed in the coolant 236. Since the color wheel unit 231 of the present invention has an excellent sealing, even when it is immersed in the coolant, the coolant does not penetrate into the color wheel unit 231.

Beams reflected from the concave mirror 238 and condensed are absorbed by the color wheel case on the periphery of the light incident opening when the beams pass through the opening of the color wheel unit 231. Further, beams which have been subjected to color separation and reflected from the color filter of the color wheel return toward the lamp again, and there are some beams which are absorbed inside the color wheel case. As described above, the beams which have been absorbed inside the color wheel case are all converted into heat, thereby increasing the temperature of the color wheel unit. Further, the temperature of the color wheel unit 231 which is positioned in the vicinity of the lamp 233 is increased by the radiation heat. When the color wheel unit 231 under these thermally harsh conditions is to be cooled, the radiating fin part which is especially formed on the color wheel case or the motor is cooled by the coolant 236 in the cooling unit 235. Thereby, not only the color wheel cases but also the color wheel and the motor, which are sealed in the case, can be sufficiently cooled. When the coolant 236 is circulated so as to be discharged outside of the cooling unit 235, forcefully cooled, and injected again to the cooling unit 235, the cooling effects are further increased.

In this twentieth embodiment, a projection-type display using the projection lens is used as the field sequential color display device, while a direct-view-type field sequential color display device using an eyepiece in place of the projection lens can be used.

[Embodiment 21]

Hereinafter, a field sequential color display device according to the twenty-first embodiment of the present invention will be described with reference to the drawings.

Figure 24:
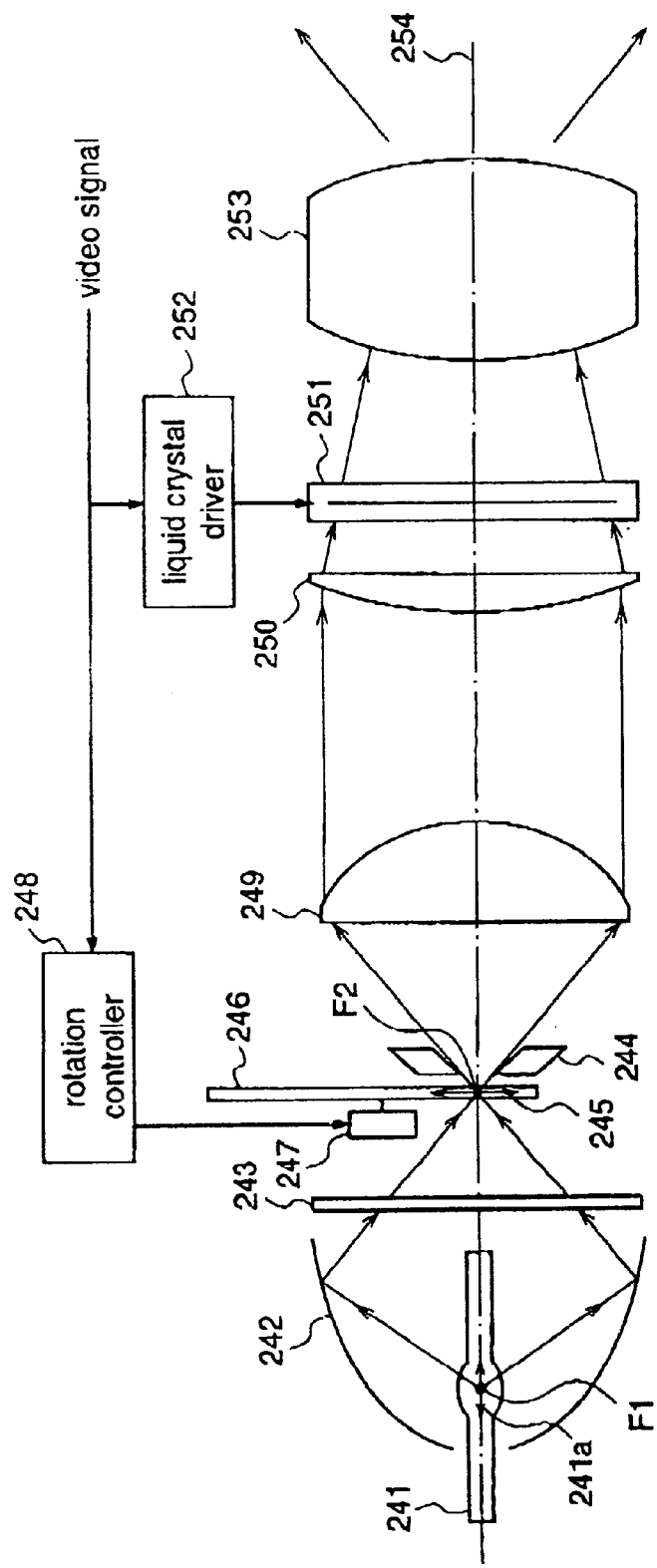
FIG. 24 is a diagram illustrating a structure of a field sequential color display device according to a twenty-third embodiment of the present invention.

FIG. 24 is a diagram illustrating a structure of the field sequential color display device of the twenty-first embodiment.

In FIG. 24, the field sequential color display device comprises a lamp 241, an ellipsoidal mirror 242, an UV-IR cut-off filter 243, a flare diaphragm 244, a color wheel 246, a rotating motor 247, a rotation controller 248, a condensing lens 249, a field lens 250, a transmission-type LCD PANEL 251, a liquid crystal driver 252, and a projection lens 253.

The lamp 241 is an extra-high pressure mercury lamp. The lamp 241 is positioned so that the center of gravity of an emission part 241a which is formed between its electrodes almost matches to a first focus F1 (short focus) of the ellipsoidal mirror.

The ellipsoidal mirror 242 efficiently condenses light emitted from the lamp 241 to form a condensation spot 245 at a second focus F2 (long focus). The condensation spot 245 is a secondary light source which is equivalent to the real image of the emission part 241a. The UV-IR cut-off filter 243 eliminates ultraviolet rays and infrared rays from the light emitted from the discharge lamp 241.

The flare diaphragm 244 is a conical diaphragm which is positioned on the light radiating side of the color wheel 246, and shades part of light which has been condensed by the ellipsoidal mirror 242 and transmitted through the color wheel 246. Further, when a thermoplastic plastic such as PPS (polyphenylene sulfide, heat-resistant temperature is 260° C.) is used as the material of the flare diaphragm 244, the flare diaphragm 244 can be obtained at low costs.

Figure 25:
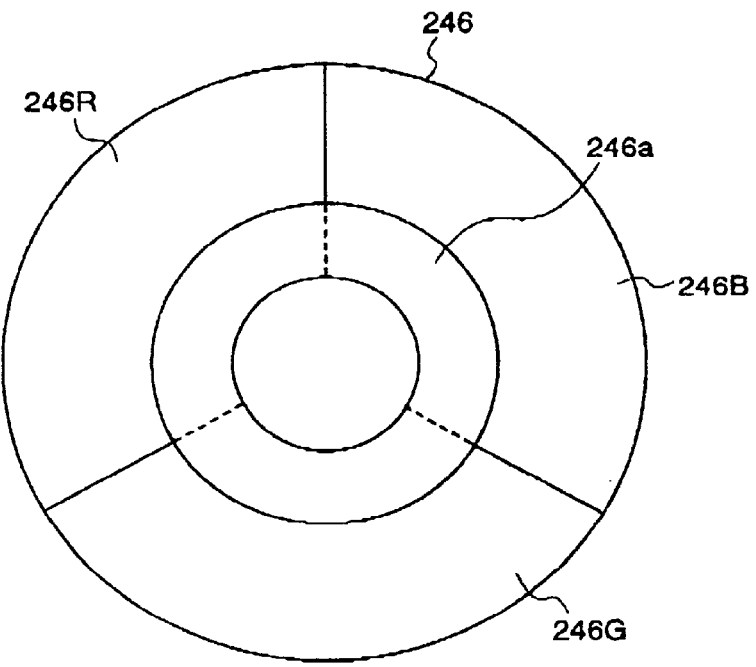
FIG. 25 is a front view illustrating a color wheel in FIG. 24.

The color wheel 246, for example, as shown in FIG. 25, comprises fan-shaped red, green, and blue color filters 246R, 246G, and 246B, which are combined in the form of a disk and fixed by a doughnut-shaped retainer 246a, and is positioned so that the color wheel 246 surface matches to the position of the second focus F2 of the ellipsoidal mirror 242. The rotating motor 247 is mounted on the color wheel 246. A color wheel assembly which is constituted by the color wheel 246 and the rotating motor 247, is the color wheel assembly described in any of the first to fourth embodiments. The motor contains a sensor for detecting the rotation of the motor, and outputs one pulse for one revolution of the motor.

The rotation controller 248 receives a video signal of each of the colors red, green and blue, and drives the rotating motor 247 in accordance with a synchronous signal included in the video signal, so that light having a band of each color is transmitted through the color wheel 246 in synchronization with the display of the LCD PANEL 251 of each of the colors red, blue and green. Here, to control the rotation of the color wheel 248, the position detection is required, and the rotation controller 248 detects the rotation speed and position of the color wheel on the basis of a pulse signal which is output from the rotating motor 247.

The condensing lens 249 is a positive power plane-convex lens, and efficiently condenses light which has been transmitted through the color wheel 246 on the LCD PANEL 251. The field lens 250 is used for condensing illumination light to the LCD PANEL 251 from the condensing lens 249 and guiding the light to the projection lens 253.

The LCD PANEL 251 is a ferroelectric LCOS comprising a liquid crystal layer, and a bistable device for applying voltage to the liquid crystal layer to switch between two states (ON/OFF). In the LCD PANEL 251, for example, by exerting a PWM (pulse width modulation) control to the gradation representation, the ON time of the bistable device can be changed, thereby changing the orientation of the liquid crystal molecule. In addition, the LCD PANEL 251 has polarizing plates (not shown) on its incidence side and radiation side, and its polarizing axis is set according to the orientation of the liquid crystal molecule. Since the bistable device has a relatively short response time, it is suitable for cases where the color sequential display is performed by the LCD PANEL 251, like in the present invention.

The liquid crystal driver 252 exerts the PWM (pulse width modulation) control for the LCD PANEL 251 in accordance with a video signal of red, green or blue, which is received from outside.

The projection lens 253 receives light which has been transmitted through the LCD PANEL 251, and enlarges an image on the LCD PANEL 251, i.e., an optical image, to enlargedly project the same on a screen (not shown).

Hereinafter, the operation of the field sequential color display device according to the twenty-first embodiment of the present invention is described.

When the light emitted from the lamp 241 is condensed by the ellipsoidal mirror 242, and incident on the color wheel 246, a condensation spot 245 is formed on the surface of the color wheel 246. When the respective color filters 246R, 246G, and 246D pass through the condensation spot 245 because of the rotation of the rotating motor 247, light beams of red, green, and blue bands are successively transmitted through the respective color filters 246R, 246G, and 246B.

Then, the rotation controller 248 controls the rotation of the color wheel 246 so that, for example, a period during which the LCD PANEL 251 is controlled by the liquid crystal driver 252 in accordance with the video signal for red display is synchronized with a period during which the red filter 246R of the color wheel 246 is passing through the condensation spot 245. The rotation controller 248 similarly controls the rotation of the color wheel 246 also when it receives other video signals of green or blue.

When the color wheel 246 is thus rotated, and monochrome gradation displays of red, green and blue are switched in short periods in a time-multiplexed manner to display the same on the LCD PANEL 251, images displayed on the screen are consequently composed visually and the viewer recognizes full-colored images.

However, during a predetermined period during which the respective boundaries of the color filters 246R, 246G and 246B are passing through the condensation spot 245, the condensation spot 245 extends over two adjacent color filters on the color wheel 246. In this case, the LCD PANEL 251 is controlled to be displayed in black, thereby preventing the occurrence of color mixture.

Figure 26:
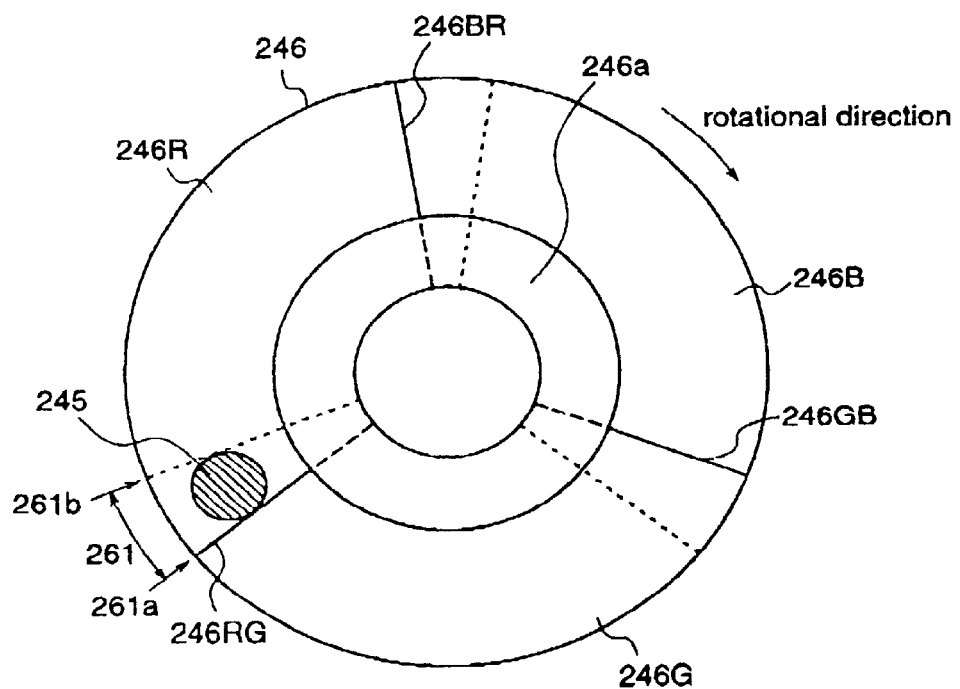
FIG. 26 is a diagram for explaining the relationship between a color wheel and a condensation spot, seen from the light incident side according to the twenty-third embodiment.

FIG. 26 is a diagram for complementarily explaining the relationship between the color wheel 246 and the condensation spot 245 seen from the incidence side of the color wheel 246, and the black display period of the LCD PANEL 251 is described with reference to this figure. FIG. 26 shows an initial state of usage of the lamp 241.

When the color wheel 246 is rotated in the direction shown by an arrow in the figure, assume that a period during which the boundary 246RG of the red color filter and the green color filter is passing through the condensation spot 245 is set as the black display period of the LCD PANEL 251. Also as for other boundaries 246GB and 246BR, periods when the boundaries are passing through the condensation spot 245 are similarly set as the black display period. Accordingly, the black display period of the LCD PANEL 251 is set three times per one revolution of the color wheel 246. This black display period is set according to the size of the condensation spot 245 which is formed on the color wheel 246 in the initial stage of usage of the lamp 241.

In a relatively early stage when little time has elapsed after the beginning of use of the lamp 241, light beams which have been condensed by the ellipsoidal mirror 242 reach the color wheel 246, and the condensation spot 245 having the size as shown in FIG. 26 is formed on the surface of the color wheel 246. Since the period during which the condensation spot 245 is extending over two adjacent color filters is shorter than the black display time of the LCD PANEL 251 in this stage, no color-mixed optical image is formed on the LCD PANEL 251.

Figure 27:
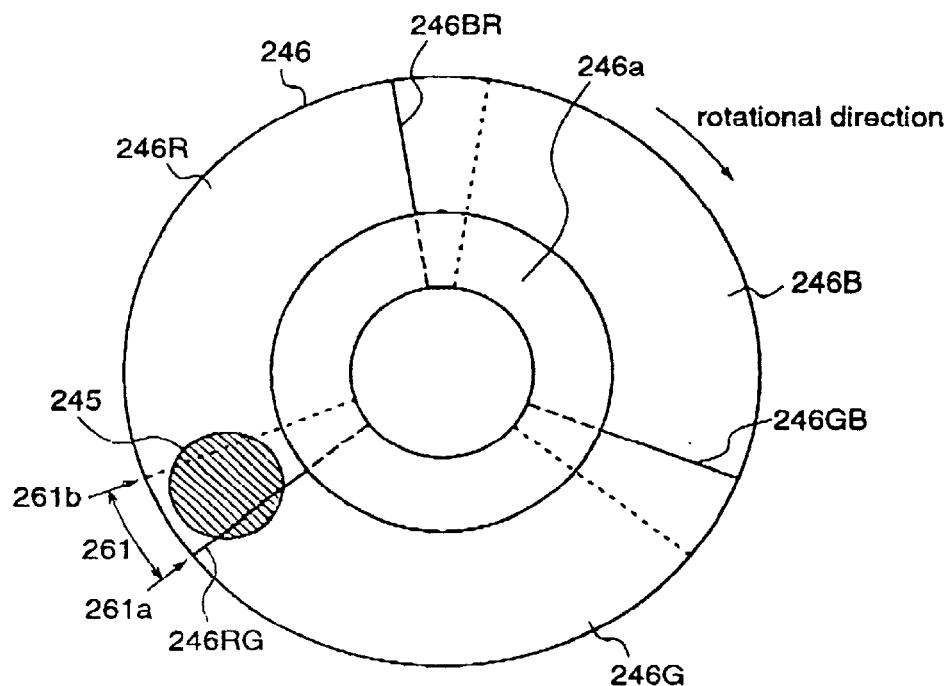
FIG. 27 is a diagram for explaining the relationship between the color wheel and the condensation spot, seen from the light incident side according to the twenty-third embodiment.

On the other hand, as the lamp 241 is used for a long time, the arc length is increased in length, and the diameter of the condensation spot 245 is increased in proportion to the arc length as shown in FIG. 27. Therefore, the period during which the condensation spot 245 extends over adjacent two color filters becomes longer than the black display period of the LCD PANEL 251, and accordingly a color-mixed optical image is formed on the LCD PANEL 251.

This problem is described in more detail with reference to FIGS. 26 and 27. When the condensation spot 245 is formed on the red filter 246R, the LCD PANEL 251 carried out the driving for red display. Then, immediately before the boundary 246RG of the color wheel 246 reaches a start point 261a of the black display period 261, i.e., immediately before the LCD PANEL 251 carries out the black display, a part of the condensation spot 245 is also in the green filter 246G area, and thus, a video in which green is mixed with a red display is displayed on the LCD PANEL 251.

Then, when the boundary 246RG reaches the end point 261b of the black display period 261, the LCD PANEL 251 finishes the black display, and thereafter immediately starts driving for green display. However, since a part of the condensation spot 245 is also in the red filter 246R area at that time, a video in which red is mixed with a green display is displayed on the LCD PANEL 251.

Also when the respective boundaries 246GB and 246BR pass through the condensation spot 245, the LCD PANEL 251 similarly display an image having blue and green mixed and an image having blue and red mixed, respectively, which are different from the colors to be normally displayed.

In this case, a rather long black display period can be previously set on the assumption that the arc length of the light source is increased. However, when the black display period of the LCD PANEL 251 becomes longer, the brightness of the displayed image is undesirably reduced.

Thus, in the present invention, to solve the aforementioned problem, part of light which has been condensed by the ellipsoidal mirror 242 and transmitted through the color wheel 246 is shaded by the flare diaphragm 244, thereby preventing the size of the condensation spot 245 from becoming larger than a desired size.

Hereinafter, the specific structure and function of the flare diaphragm 244 is described with reference to FIGS. 28 and 29.

Figure 28:
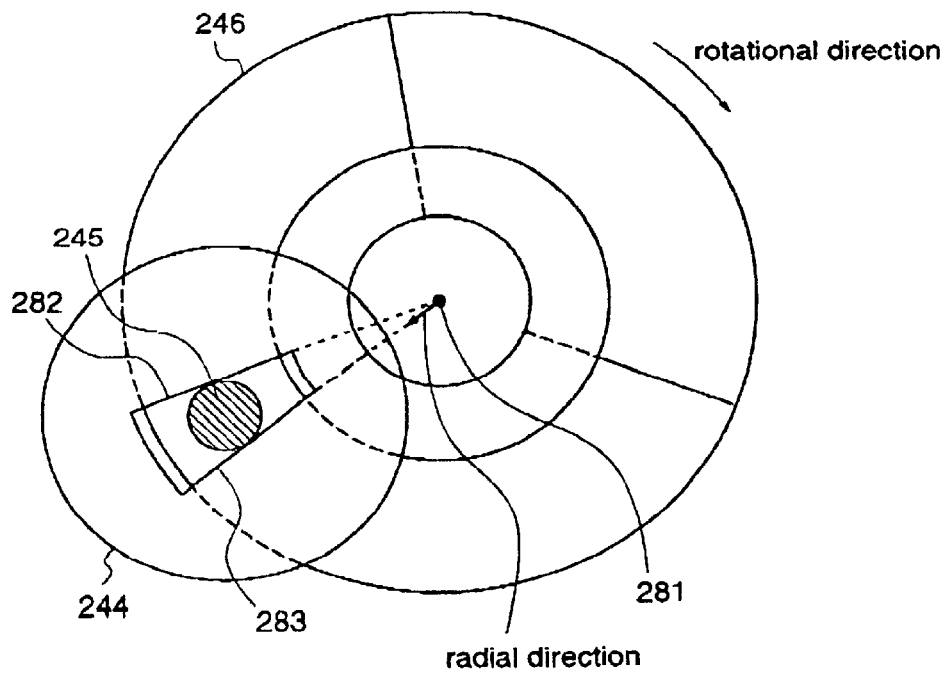
FIG. 28 is a diagram for explaining the relationship among the color wheel, the condensation spot and a flare diaphragm, seen from the light radiating side according to the twenty-third embodiment.

FIG. 28 is a diagram for explaining the relationship among the color wheel 246, the condensation spot 245 and the flare diaphragm 244, seen from the radiation side of the color wheel 246, and shows a initial state of use of the lamp 241.

Figure 29:
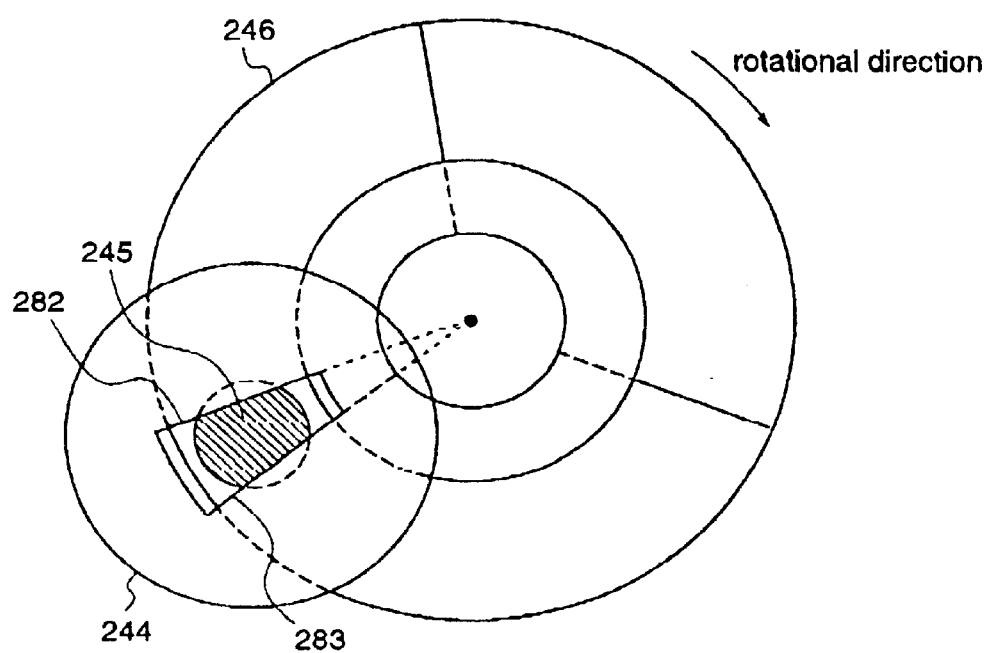
FIG. 29 is a diagram for explaining the relationship among the color wheel, the condensation spot and the flare diaphragm, seen from the light radiating side according to the twenty-third embodiment.

In FIG. 29, the flare diaphragm 244 should limit the size of the condensation spot 245 along direction of the rotation of the color wheel 246. Therefore, the opening width of the flare diaphragm 244 in the rotational direction of the color wheel 246 is set to be approximately equal to the diameter of the condensation spot 245 at the beginning of the use of the lamp 241. On the other hand, as for the radial direction of the color wheel 246, it is not particularly required to limit the opening width of the flare diaphragm 244, and a sufficient opening width is given not to shade the condensation spot 245.

Here, in a relatively early stage when little time elapsed after the beginning of use of the lamp 241, the condensation spot 245 is small as shown in FIG. 28, and light which has been transmitted through the color wheel 246 is hardly shaded by the flare diaphragm 244, whereby the light utilization efficiently is not significantly reduced by the flare diaphragm 244.

When the size of the condensation spot 245 becomes larger as shown in FIG. 29, light is incident on two adjacent color filters at the same time immediately before and after the black display period of the LCD PANEL 251. However, the flare diaphragm 244 shades the light which causes the occurrence of the color mixture, thereby preventing the occurrence of the color mixture in images. Besides, by using the flare diaphragm 244, the black display period of the LCD PANEL 251 can be minimized, whereby high-quality images can be obtained without impairing the luminance of the images.

Even when the opening width of the flare diaphragm 244 in the rotational direction of the color wheel 246 is set smaller than the diameter of the condensation spot 245 at the beginning of use of the lamp 241, the effects of the present invention can be obtained. However, in this case, the light utilization efficiency is reduced according to the brightness distribution of the condensation spot 245.

Further, since the luminous intensity of the light which has been transmitted through the color wheel 246 is about one-third as high as that of the incident light, the quantity of light which is shaded by the flare diaphragm 244 positioned at the radiation side of the color wheel 246 is also about one-third as large as that of the incident light. Thereby, heat generation of the flare diaphragm 244 caused by the light is suppressed, thereby increasing the reliability of the device.

Further, since the flare diaphragm 244 is conical in shape, air resistance at the rotation of the color wheel 246 can be reduced in size, thereby suppressing noises. Here, the flare diaphragm 244 is not limited to be conical, and any diaphragm can be used as long as a plane orthogonal to the optical axis is approximately circular in cross section.

According to the so-constructed field sequential color display device, by providing the flare diaphragm 244, the occurrence of the color mixture in images can be prevented without setting the black display period of the LCD PANEL 251 unnecessarily longer, whereby the field sequential color display device can realize bright and high-quality image displays. In addition, by positioning the flare diaphragm 244 on the radiation side of the color wheel 246, increases in the temperature of the flare diaphragm 244 can be suppressed, thereby increasing the reliability of the device. Further, by using the conical flare diaphragm 244, noises at the rotation of the color wheel 246 can be suppressed.

[Embodiment 22]

Hereinafter, a field sequential color display device according to the twenty-second embodiment of the present invention will be described with reference to the drawings.

Figure 30:
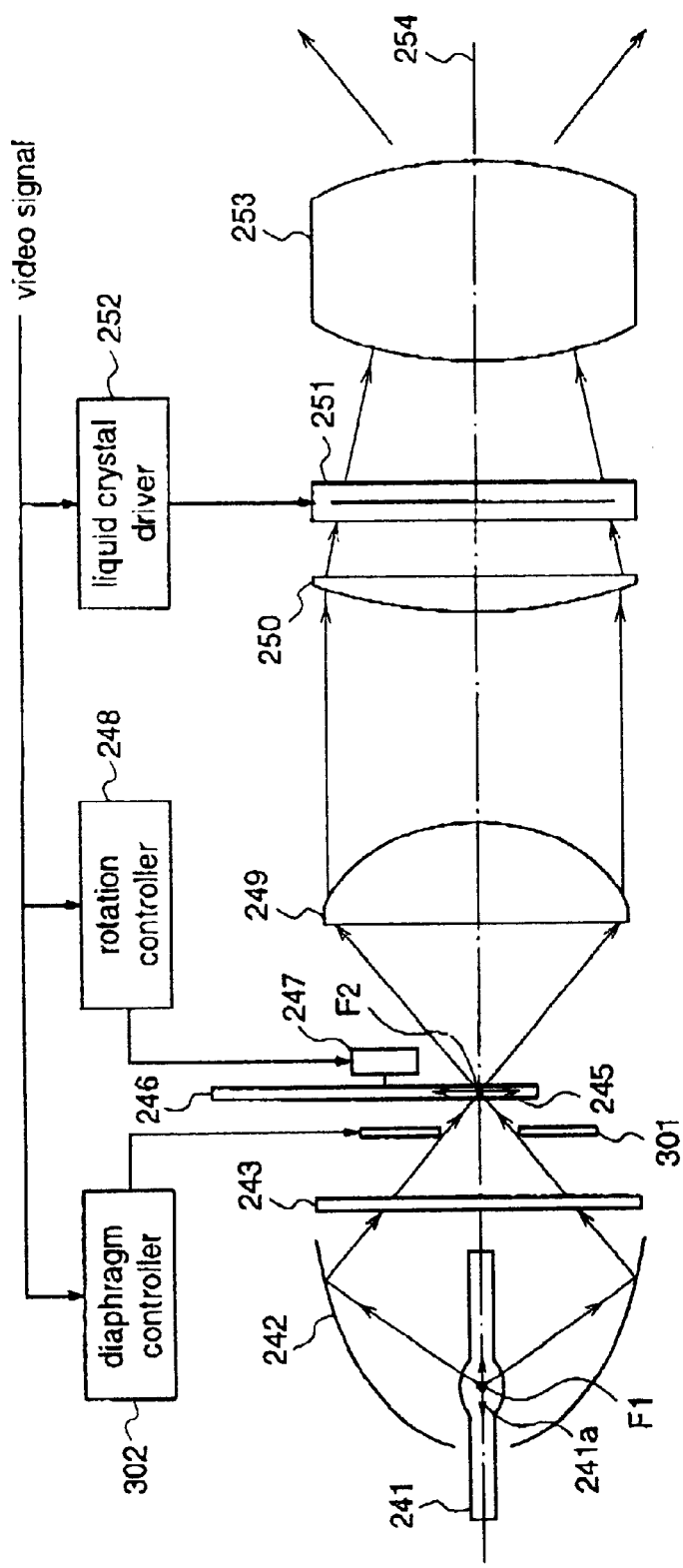
FIG. 30 is a diagram illustrating a structure of a field sequential color display device according to a twenty-fourth embodiment of the present invention.
Figure 31:
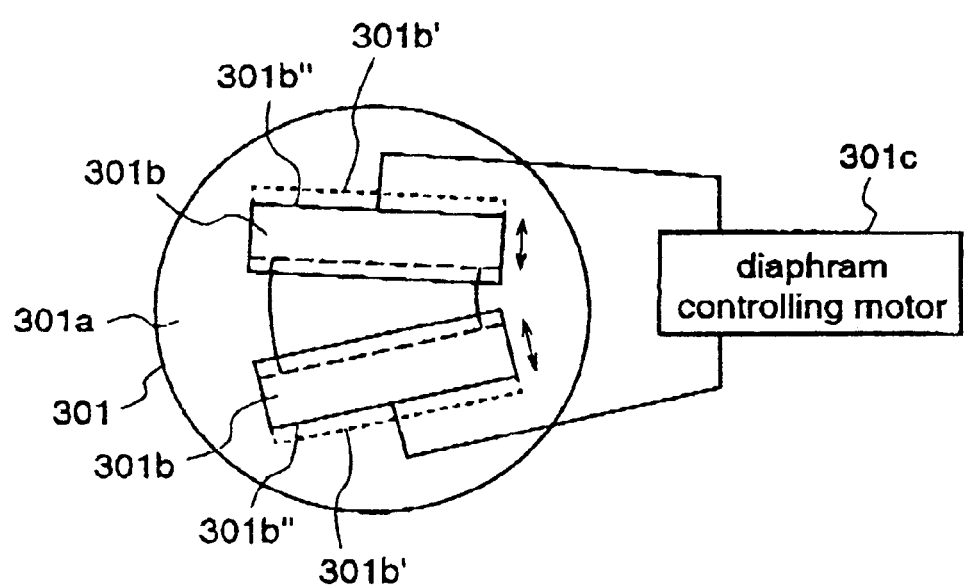
FIG. 31 is a front view illustrating a flare diaphragm in FIG. 30.

FIG. 30 is a diagram illustrating a structure of the field sequential color display device of the twenty-second embodiment. In this figure, the same reference numerals as those in FIG. 24 denote the same or corresponding parts. FIG. 31 is a front view illustrating a flare diaphragm 301 in FIG. 30.

This twenty-second embodiment is different from the twenty-first embodiment in that the size of the opening of the flare diaphragm 301 can be changed in synchronization with the displaying on the LCD PANEL 251.

To be more specific, as shown in FIG. 31, the flare diaphragm 301 is constituted by a main diaphragm 301a, moving parts 301b, and a diaphragm controlling motor 301c for driving the moving parts 30 1b.

The shape of the opening of the main diaphragm 301a is the same as that shown in FIG. 28, and the opening width in the rotational direction of the color wheel 246 is set to be approximately equal to the diameter of the condensation spot 245 at the beginning of use of the lamp 241. When the diaphragm controlling motor 301c is driven, the moving parts 301b are moved from positions shown by full lines 301b" to positions shown by broken lines 301b' or in the reverse direction, whereby the size of the opening of the flare diaphragm 301 can be adjusted.

The driving of the diaphragm controlling motor 301c is carried out by a diaphragm controller 302 as shown in FIG. 30. The diaphragm controller 302 receives a video signal of respective colors of red, blue and green from an external device, then drives the diaphragm controlling motor 301c in accordance with a synchronous signal included in the video signal, and exerts a control so that image displaying on the LCD PANEL 251 is synchronized with the opening/closing of the moving parts 301b of the flare diaphragm 301.

For example, while the LCD PANEL 251 displays video corresponding to red or blue, the moving parts 301b of the flare diaphragm 301 are moved to the positions shown by the broken lines 301b', in accordance with the driving of the controlling motor 301c. On the other hand, while the LCD PANEL 251 displays video corresponding to green, the moving parts 301b are moved to the positions shown by the full lines 301b". Consequently, the quantity of green light which reaches the LCD PANEL 251 is reduced, whereby the white balance in the white display is changed.

When the size of the opening of the flare diaphragm 301 is adjusted as described above when light of a specific color passes through the flare diaphragm 301, the white balance of the image can be arbitrarily adjusted.

According to the so-constructed field sequential color display device, the size of the opening of the flare diaphragm 301 can be adjusted in synchronization with the video signal. Therefore, the color-mixed display of the image on the LCD PANEL 251 can be prevented, and the white balance of the displayed image can be arbitrarily adjusted, whereby the field sequential color display device can realize bright and high-quality image displays.

[Embodiment 23]

Hereinafter, a field sequential color display device according to the twenty-third embodiment of the present invention will be described with reference to the drawings.

Figure 32:
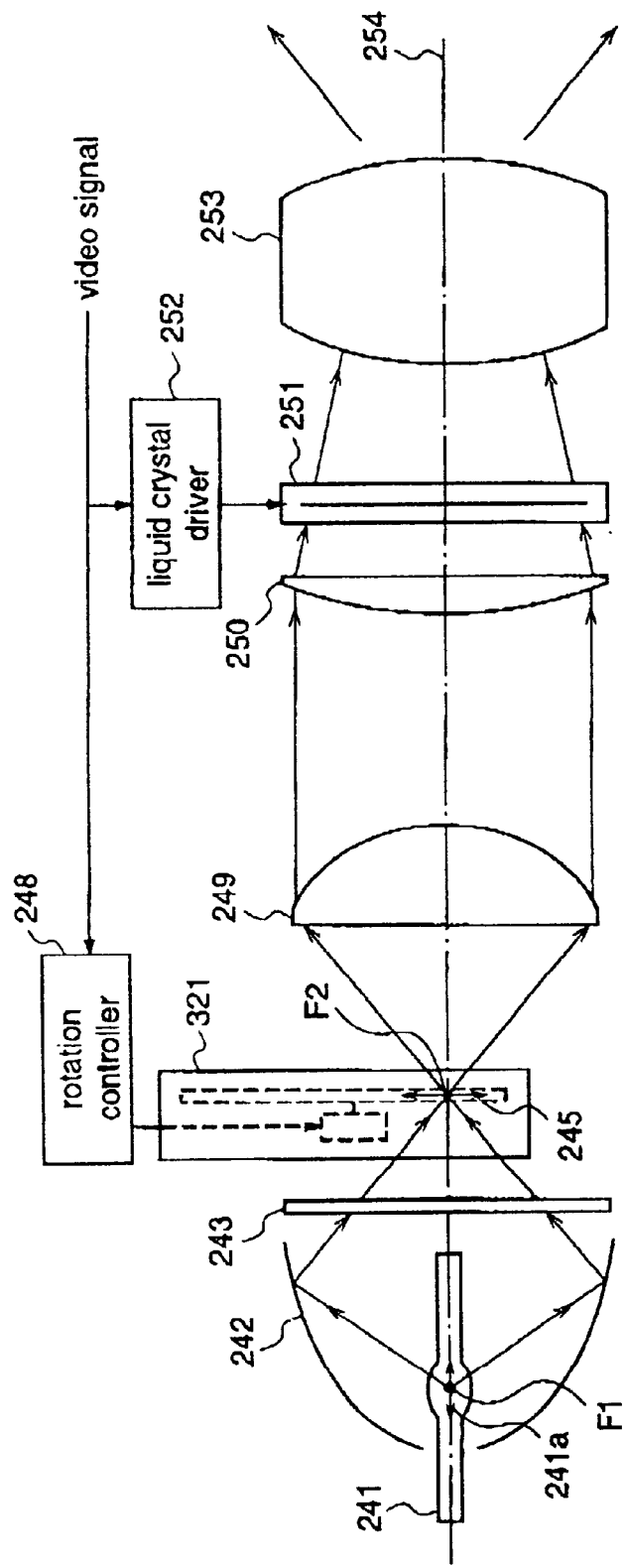
FIG. 32 is a diagram illustrating a structure of a field sequential color display device according to a twenty-fifth embodiment of the present invention.
Figure 33:
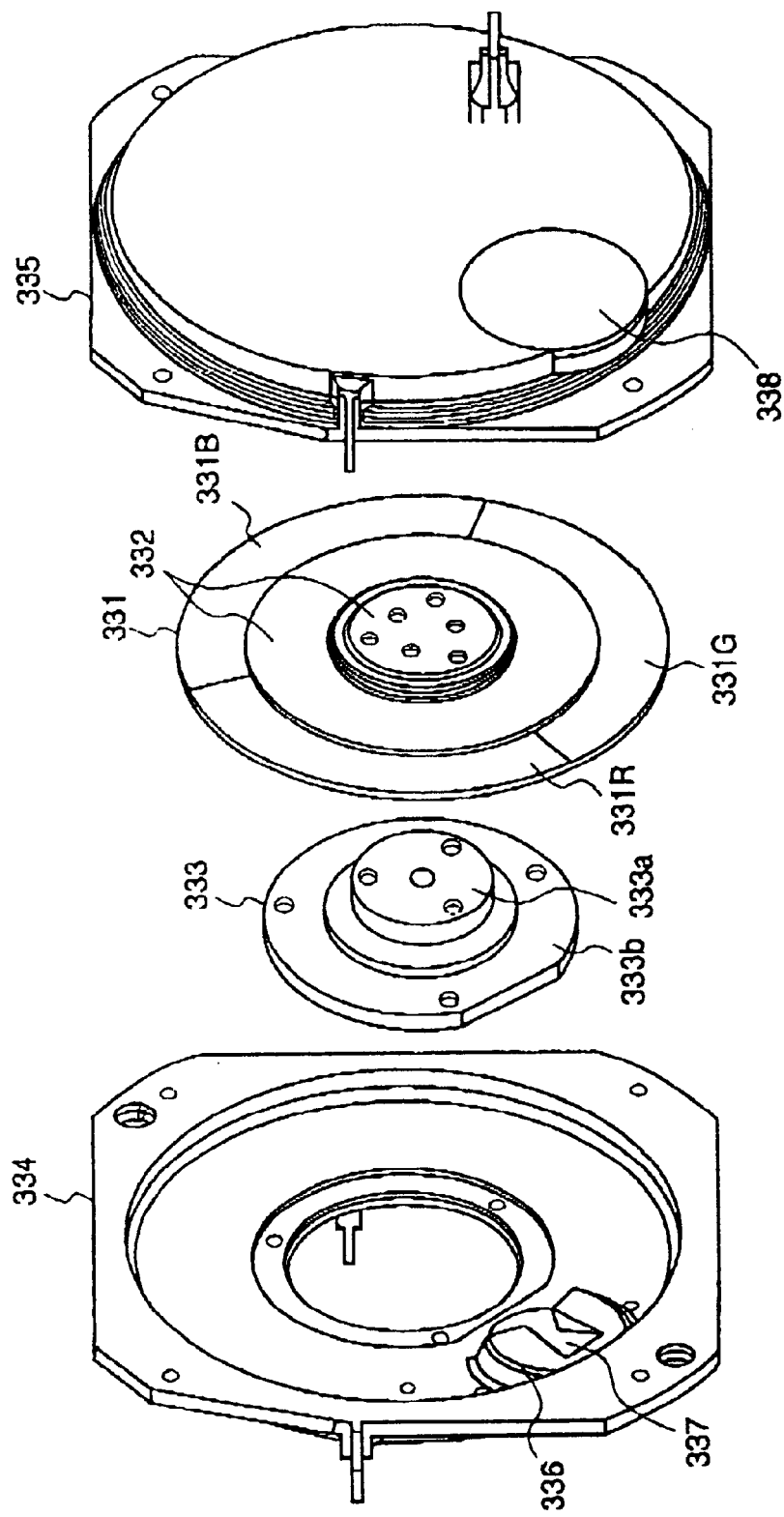
FIG. 33 is an exploded perspective view illustrating a color wheel unit in FIG. 32.

FIG. 32 is a diagram illustrating a structure of the field sequential color display device of the twenty-third embodiment. In this figure, the same reference numerals as those in FIG. 30 denote the same or corresponding parts, and a color wheel unit 321 is included. FIG. 33 is an exploded perspective view illustrating the color wheel unit in FIG. 32.

The color wheel unit 321 is constituted by a color wheel 331, a motor 333, and color wheel cases 334 and 335.

The color wheel 331 has fan-shaped red, green and blue color filters 331R, 331G and 331B, which are combined in the form of a disk and fixed by a retainer 332, and is rotated by the motor 333.

The motor 333 is constituted by a rotating part 333a and a base plate 333b. The rotating part 333a of the motor 333 is connected to the retainer 332 of the color wheel 331, and the base plate 333b of the motor 333 is fixed to the color wheel case 334.

The color wheel case 334 comprises an entrance window 337 having a sufficient size for an optical path which is covered with translucent glass, and a flare diaphragm 336. The color wheel case 335 comprises a radiation window 338 having a sufficient size for an optical path which is covered with translucent glass. In place of installation of the UV-IR cut-off filter 243, at least one of the translucent glass which is provided on the entrance window 337 and the radiation window 338 of the color wheel cases 334 and 335 can be replaced with a filter for filtering ultraviolet rays or infrared rays.

The flare diaphragm 336 has a diaphragm opening which protrudes toward the inside of the color wheel case 334 so that the diaphragm opening is positioned in the proximity of the color wheel 331. Further, the protruding part of the flare diaphragm 336 is formed in a cylindrical shape. The flare diaphragm 336 is set to have an opening width in the rotational direction of the color wheel 335, which is approximately equal to the diameter of the condensation spot 245 at the beginning of use of the lamp 241. The flare diaphragm 336 may be either formed separately from or integrated with the color wheel case 334.

When the color wheel case 335 is fixed to the color wheel case 334, the color wheel 331 can be retained in a sealed space, thereby increasing the stability at the breakage of the color wheel 331.

The light which has been condensed by the ellipsoidal mirror 242 is incident on the entrance window 337 of the color wheel case 334, and the light which has been selectively transmitted through the color wheel 331 is radiated from the radiation window 338 of the color wheel case 335. The flare diaphragm 336 has the same function as that of the twenty-first embodiment, and it shades part of the light which is incident on the color wheel cases 334 and 335, thereby preventing the color mixture of images, which may be caused after a long time of use of the lamp 241.

In this case, the air gap between the color wheel 331 and the flare diaphragm 336 when the color wheel 331, the motor 333, and the color wheel cases 334 and 335 are fixed to each other is set for example at 2 mm. It is more preferable that the air gap between the color wheel 331 and the flare diaphragm 336 is as small as possible, and when this is set at 5 mm or smaller, the shading effects can he efficiently obtained.

In addition, even when the flare diaphragm 336 is positioned in the proximity of the color wheel 331 as described above, the protrusion of the flare diaphragm 336 is formed in a columnar shape, and accordingly the air resistance of the flare diaphragm 336 is small at the rotation of the color wheel 331, thereby reducing noises. The protrusion of the flare diaphragm 336 may have a shape other than the columnar shape. The same effects can be obtained as long as the protrusion has a shape having a smaller air resistance, for example, a conical shape having inclined sides.

According to the so-constructed field sequential color display device, by sealing and retaining the color wheel 331 in the color wheel cases 334 and 335 with the dare diaphragm 336, the color mixture of the image of the LCD PANEL 251 can be prevented, and the safe performance can be improved. Further, when the protrusion of the flare diaphragm 336 in the color wheel cases 334 and 335 has a shape having a relatively small air resistance, the noises can be reduced. Besides, when the air gap between the color wheel 331 and the flare diaphragm 336 is 5 mm or smaller, the shading effects can be efficiently obtained.

[Embodiment 24]

Hereinafter, a field sequential color display device according to the twenty-fourth embodiment of the present invention will be described with reference to the drawings.

Figure 34:
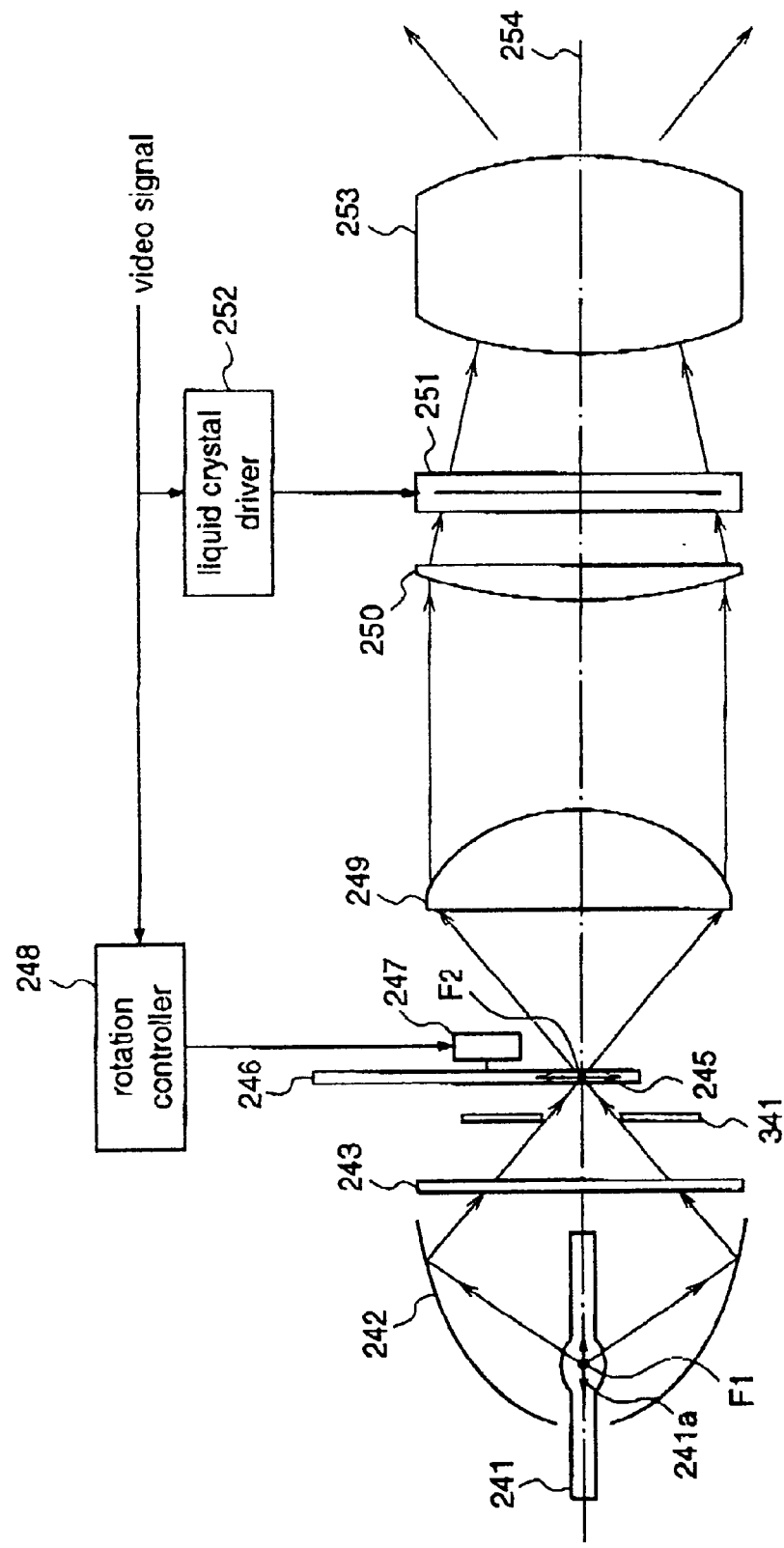
FIG. 34 is a diagram illustrating a structure of afield sequential color display device according to a twenty-sixth embodiment of the present invention.
Figure 35:
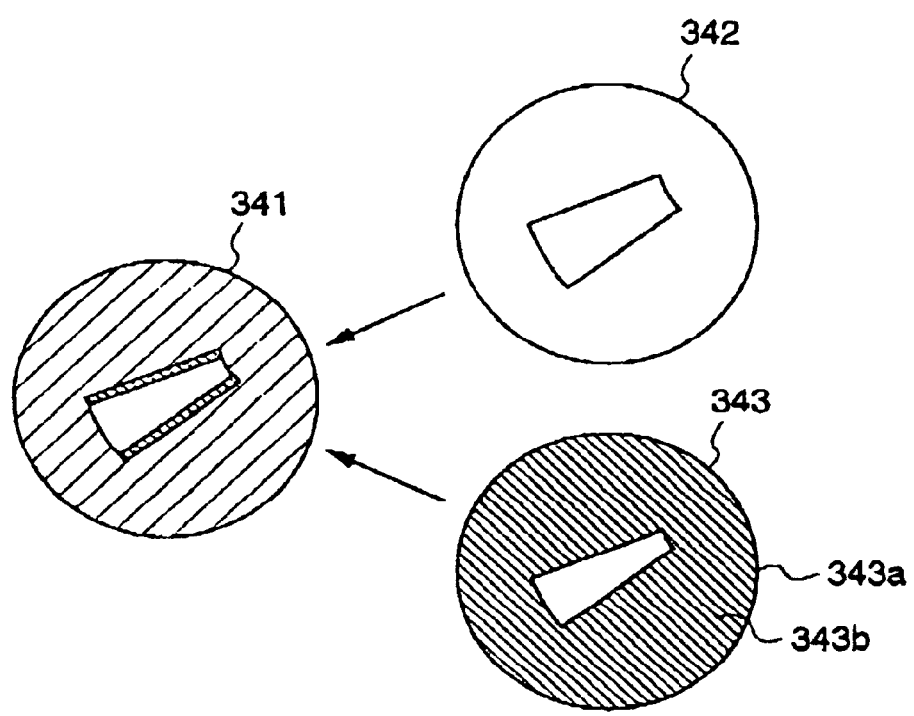
FIG. 35 is a front view illustrating a flare diaphragm in FIG. 34.
Figure 36:
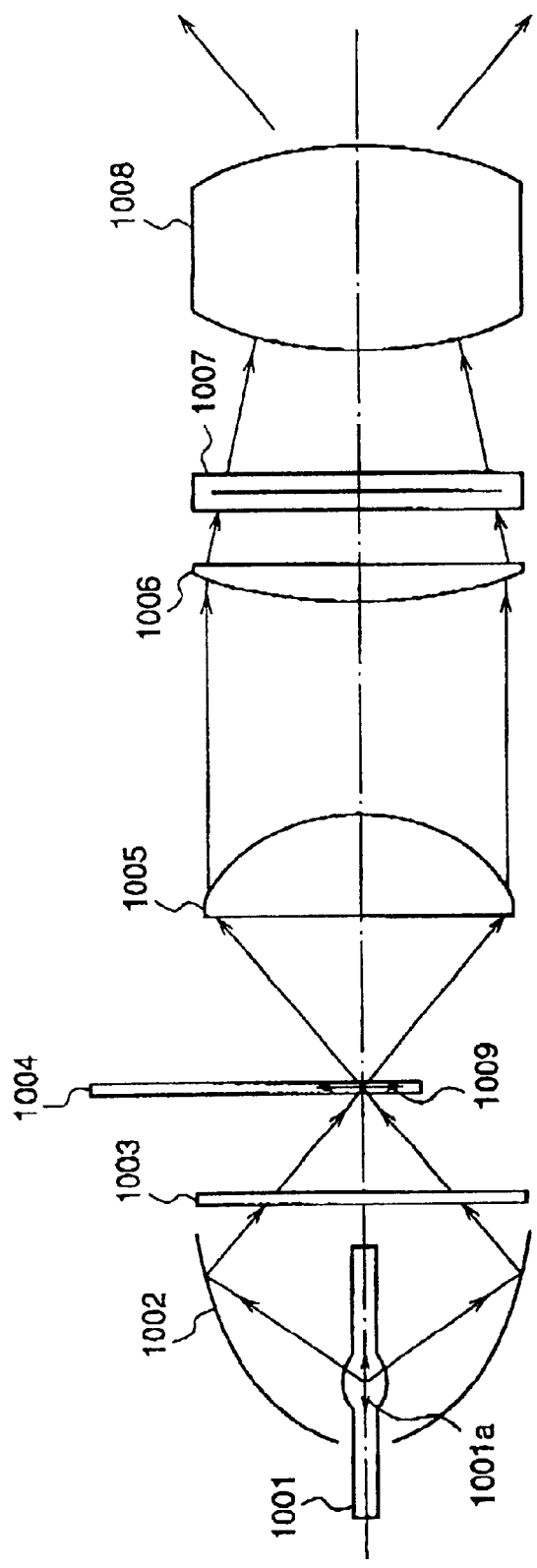
FIG. 36 is a diagram illustrating a structure of a prior art field sequential color display device.
Figure 37:
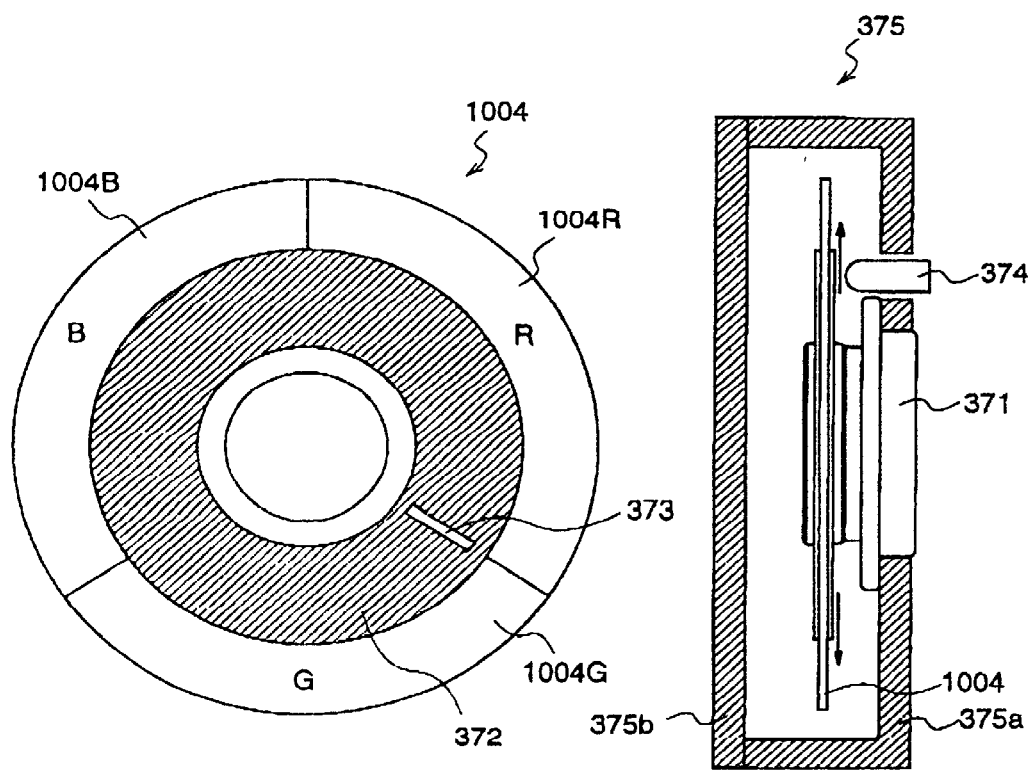
FIG. 37 is a diagram for explaining a prior art color wheel assembly.
Figure 38:
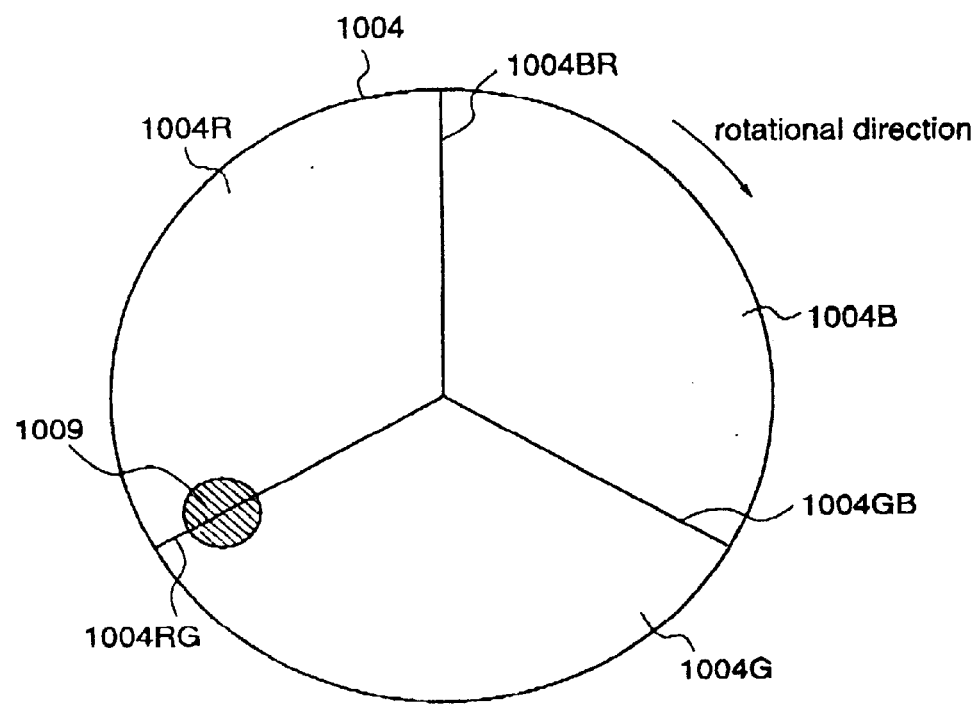
FIG. 38 is a diagram for explaining the relationship between a color wheel and a condensation spot in the prior art field sequential color display device.

FIG. 34 is a diagram illustrating a structure of the field sequential color display device of the twenty-fourth embodiment. In this figure, the same reference numerals as those of FIG. 24 denote the same or corresponding parts, and a flare diaphragm 341 is included. FIG. 35 is a front view illustrating the flare diaphragm 341 in FIG. 34.

The flare diaphragm 341 is constituted by a main diaphragm 342 and an auxiliary diaphragm 343.

The opening width of the main diaphragm 342 in the rotational direction of the color wheel 246 is set to be approximately equal to the diameter of the condensation spot 245 at the beginning of use of the lamp 241, like in FIG. 27.

The auxiliary diaphragm 343 is obtained by coating a multi-layer film 343b on a diagonally shaded area of a translucent glass 343a. The multi-layer film 343b reflects on the auxiliary diaphragm 343, and the multi-layer film 343b is evaporated so that an area where no multi-layer film 343b is evaporated is smaller than the opening of the main diaphragm 342.

Thereby, after the light incident on the flare diaphragm 341 has passed through the opening of the main diaphragm 342, part of the specific wavelength light is reflected on the multi-layer film 343b on the auxiliary diaphragm 343, thereby reducing the quantity of passed specific wavelength light. For example, when the multi-layer film 343b reflects only light of the green band, the light incident on the flare diaphragm 341 is radiated from the flare diaphragm 342 with reduced green band light.

Therefore, when the characteristics of the multi-layer film 343b are set according to the spectrum of the light source, the white balance of displayed images on the LCD PANEL 251 can be arbitrarily set.

In place of using the main diaphragm 342 as shown in FIG. 35, for examples silver or aluminum which efficiently reflects visible radiation can be evaporated on the plane of the translucent glass 343a which constitutes the flare diaphragm 343, to form an evaporated film having a function which is equivalent to the main diaphragm 342. In this case, the evaporated film for the main diaphragm and the multi-layer film 343b for the auxiliary diaphragm can be deposited on the same plane of the translucent glass 343a, or the respective films can be formed on opposing sides of the translucent glass 343a, respectively.

According to the so-constructed field sequential color display device, since the multi-layer film which reflects specific wavelength light is provided on the flare diaphragm 341, the color-mixed display of the image by the LCD PANEL 251 can be prevented, and the white balance of the displayed images can be arbitrarily adjusted, whereby the field sequential color display device which can obtain bright and high-quality image display can be realized.

In this embodiment, the extra-high pressure mercury lamp is used as the lamp, while a metal halide lamp, a xenon lamp or the like can be also used. A light source other than the discharge lamp, such as a halogen lamp and an LED, can be used.

In this twenty-fourth embodiment, the ellipsoidal mirror is used as the condensing means for condensing the light emitted from the lamp. However, in place of the ellipsoidal minor, a parabolic mirror and a positive power lens can be combined to condense the light emitted from the light source. Further, parallel light reflected from the parabolic mirror can be directly used at a condensation spot.

Further, the positioning of the flare diaphragm is not particularly limited, while color-mixed display of the image can be prevented more efficiently in a position which is nearer to a position where the condensation spot of the color wheel 246 is formed. To be more specific, it is more preferable to position the flare diaphragm within 5 mm of air gap from the condensation spot 245.

Further, it is preferable that the flare diaphragm has a shape which reduces the air resistance at the rotation of the color wheel, for example, a plane orthogonal to the optical axis is approximately circular in cross section.

Further, the flare diaphragm can be positioned on either the light incident side or light radiating side of the color wheel, while it is more preferable to position the flare diaphragm on the light radiating side because the heat generation of the flare diaphragm can be suppressed.

Further, it is possible to use a color wheel which has reflective-type dichroic mirrors in place of the absorbing-type filters, and perform the selection of red, green, and blue band light on the basis of light reflected from the color wheel.

Further, the color wheel is not restricted to the one which is divided into three, i.e., red, green, and blue filters, and a color wheel which is divided into more than three can be used. In addition, the shape of the color wheel 246 is not limited to a disk shape, and any color wheel can be used as the color selection means for implementing this invention, as long as the color wheel can select light of specific wavelength bands from the incident light successively in a time-multiplexed manner.

In this twenty-fourth embodiment, the ferroelectric LCOS or the DMD is used as the SLM, while a twist nematic LCOS, a LCOS which utilizes scattering of light or the like can be used as the SLM, as long as it has a response time which enables the color sequential display.

In this embodiment, the condensing lens or field lens is used as the illumination means for illuminating the SLM, while two lens arrays or rod lens can be used in place thereof.

In this embodiment, the field sequential color display device which performs a front projection on a screen is described, while a field sequential color display device which performs a rear projection with using a translucent screen can be constituted.

According to the color wheel assembly and the field sequential color display device using the same of the present invention, the position of the color wheel can be detected only by the color wheel and the motor for rotating the color wheel, whereby the position detection signal can be obtained stably also at high-speed rotation or at elevated temperatures.

According to the color wheel assembly of the present invention, the color wheel and the motor are previously aligned, mounted, and thereafter fixed, whereby the color wheel and the motor are not dislocated. Further, a minute deviation in the precision in mounting or processing can be corrected by mechanical position adjustment or electrical phase adjustment of the sensor.

According to the color wheel assembly of the present invention, it is not required to mount a photo-sensor on the case of the color wheel, thereby preventing noises. Further, it is not required to paste an index mark to the color wheel, whereby the space of the hub for that purpose can be eliminated, and the color wheel can be miniaturized.

According to the color wheel unit and the field sequential color display device using the same of the present invention, even when the color wheel and the motor rotate at a high speed, safety is ensured, and if they should be broken, the risk of scattering of glass of the filters is reduced. Further, the radiating fin part as a radiating means is provided on the color wheel case or the motor, thereby effectively cooling the color wheel case which is easily heated by the radiation heat from the lamp or absorption of unnecessary light, whereby the reliability of the color wheel and the motor therein can be increased.

According to the color wheel unit of the present invention, even in the case of the breakage of the color wheel or the failure of the motor such as with abnormal rotation speed or abnormal noises, the maintenance can be easily performed by only detaching and replacing the color wheel unit.

According to the color wheel unit of the present invention, the light incident/radiation opening of the color wheel case is sealed with the transparent member, whereby when the color wheel is rotated at a high speed, the reduction in display luminance, resulting from absorption (attraction) of dust or dirt in the air by charged color filters which are made of glass can be prevented.

According to the color wheel unit of the present invention, the light incident/radiating opening of the color wheel case is sealed with the transparent member, and noises such as whistling sounds caused by the high-speed rotation of the color wheel or electromagnetic sounds of the motor can be excluded.

According to the color wheel unit of the present invention, the cushioning material is provided at the junction of the color wheel case lid and the color wheel case body, or the junction of the color wheel case and the motor, whereby the noises such as whistling sounds caused by the high-speed rotation of the color wheel or electromagnetic sounds of the motor can be excluded.

Further, vibrations caused by rotational unbalance of the color wheel or the motor can also be absorbed by the cushioning material which is provided at the junction of the case and the motor, or at the fixing part for fixing the color wheel unit body to the chassis or the like.

According to the field sequential color display device using the color wheel unit of the present invention, the radiation fin which is provided on the color wheel case or the motor of the color wheel unit is air-cooled by the fan or the like, thereby effectively cooling the color wheel case which is easily heated by the radiation heat from the lamp or absorption of unnecessary light, whereby the reliability of the color wheel and the motor therein can be increased.

According to the field sequential color display device using the color wheel unit of the present invention, the color wheel unit is positioned inside an envelope in which the coolant is sealed, whereby the color wheel case which is easily heated by the radiation heat from the lamp or absorption of unnecessary light can be effectively cooled, and noises such as whistling sounds caused by the high-speed rotation of the color wheel or electromagnetic sounds of the motor can be excluded.

According to the field sequential color display device of the present invention, the flare diaphragm is provided for shading part of light which has been transmitted through the color wheel, and preventing light of a color band different from a desired color which is to be displayed on the screen from being incident on the SLM, whereby the color mixture can be prevented and bright and high-quality image displays can be obtained, without setting the black display period of the SLM to be unnecessarily long.

What is claimed is:

1. A field sequential color display device comprising:
   a color wheel assembly comprising a color wheel divided into a plurality of color regions and a motor containing a magnetic sensor at a fixed portion therein, said motor being adapted to rotate said color wheel, wherein said magnetic sensor is operable to detect magnetism at a rotation portion of said motor, and said magnetic sensor outputs at least one pulse per revolution of said motor; and
   a spatial light modulator operable to display image data, said spatial light modulator being driven in synchronization with the at least one pulse which is output by said magnetic sensor.

2. A field sequential color display device comprising:
   a color wheel assembly comprising a color wheel divided into a plurality of color regions and a motor having a magnetic sensor at a fixed portion therein, said motor being adapted to rotate said color wheel, wherein said motor and said color wheel are aligned to each other, said magnetic sensor is operable to detect magnetism at a rotation portion of said motor, and said magnetic sensor outputs at least one pulse per revolution of said motor at designated color switching of said color wheel; and a spatial light modulator operable to display image data, said spatial light modulator being driven in synchronization with the at least one pulse which is output by said magnetic sensor.

3. A field sequential color display device comprising:

a color wheel assembly comprising a color wheel divided into a plurality of color regions and a motor having a magnetic sensor at a fixed portion therein, said motor being operable to rotate said color wheel, wherein said magnetic sensor is operable to detect magnetism at a rotation portion of said motor, and said magnetic sensor outputs at least one pulse per revolution of said motor; and a spatial light modulator operable to display image data, said spatial light modulator being driven in synchronization with a pulse obtained by electrically shifting a phase of the at least one pulse output by said magnetic sensor forward or backward.

4. A field sequential color display device comprising:

a color wheel assembly comprising a color wheel divided into a plurality of color regions and a motor having a magnetic sensor at a fixed portion therein, said motor being adapted to rotate said color wheel, wherein said motor and said color wheel are aligned to each other, said magnetic sensor is operable to detect magnetism at a rotation portion of said motor, and said magnetic sensor outputs at least one pulse per revolution of said motor at designated color switching of said color wheel; and a spatial light modulator operable to display image data, said spatial light modulator being driven in synchronization with a pulse which is obtained by electrically shifting a phase of the at least one pulse output by said magnetic sensor forward or backward.

5. A field sequential color display device comprising:

a light source;

condensing means for condensing light emitted from said light source;

a color wheel unit comprising a color wheel divided into red, green and blue regions, a motor adapted to rotate said color wheel, and a color wheel case housing said color wheel and said motor, said color wheel unit being operable to selectively transmit or reflect light of red, green and blue bands in a predetermined order from the light which has been condensed by said condensing means;

a spatial light modulator;

illumination means for condensing the light transmitted or reflected by said color wheel unit, and illuminating said spatial light modulator, wherein said spatial light modulator is operable to modulate the light incident from said illumination means; and projection means for projecting the light modulated by said spatial light modulator on a screen, wherein
said color wheel unit is to be air-cooled by a fan, and
a light incident/radiating part of said color wheel case is sealed with a light-transmittable member.

6. A field sequential color display device comprising:

a light source;

condensing means for condensing light emitted from said light source;

a color wheel unit comprising a color wheel divided into red, green and blue regions, a motor adapted to rotate said color wheel, and a color wheel case housing said color wheel and said motor, said color wheel unit being operable to selectively transmit or reflect light of red, green and blue bands in a predetermined order from the light which has been condensed by said condensing means;

a spatial light modulator;

illumination means for condensing the light transmitted or reflected by said color wheel unit, and illuminating said spatial light modulator, wherein said spatial light modulator is operable to modulate the light incident from said illumination means; and projection means for projecting the light modulated by said spatial light modulator on a screen, wherein
color wheel unit is to be air-cooled by a fan, and a cushioning material is inserted at one of a junction of two portions of said color wheel case, a junction between said color wheel case and said motor, and a fixing part for installing said color wheel case on a chassis.

7. A field sequential color display device comprising:

a light source;

condensing means for condensing light emitted from said light source;

a color wheel unit comprising a color wheel divided into red, green and blue regions, a motor adapted to rotate said color wheel, and a color wheel case housing said color wheel and said motor, said color wheel unit being operable to selectively transmit or reflect light of red, green and blue bands in a predetermined order from the light condensed by said condensing means;

a spatial light modulator;

illumination means for condensing the light transmitted or reflected by said color wheel unit, and illuminating said spatial light modulator, wherein said spatial light modulator is operable to modulate the light incident from said illumination means;

projection means for projecting the light modulated by said spatial light modulator on a screen; and an envelope filled with a liquid, said envelope being provided between said light source and said illumination means, and said color wheel unit being positioned in said envelope, wherein
a light incident/radiating part of said color wheel case is sealed with a light-transmittable member.

8. A field sequential color display device comprising:

a light source;

condensing means for condensing light emitted from said light source;

a color wheel unit comprising a color wheel divided into red, green and blue regions, a motor adapted to rotate said color wheel, and a color wheel case housing said color wheel and said motor, said color wheel unit being operable to selectively transmit or reflect light of red, green and blue bands in a predetermined order from the light condensed by said condensing means;

a spatial light modulator;

illumination means for condensing the light transmitted or reflected by said color wheel unit, and illuminating said spatial light modulator, wherein said spatial light modulator is operable to modulate the light incident from said illumination means;

projection means for projecting the light modulated by said spatial light modulator on a screen; and an envelope filled with a liquid, said envelope being provided between said light source and said illumination means, and said color wheel unit being positioned in said envelope, wherein a cushioning material is inserted at one of a junction of two portions of said color wheel case, a junction between said color wheel case and said motor, and a fixing part for installing said color wheel case on a chassis.

9. A field sequential color display device comprising:

a light source;

condensing means for condensing light emitted from said light source;

a color wheel for selectively transmitting or reflecting light of red, green and blue bands in a predetermined order from the light condensed by said condensing means;

a spatial modulator;

illumination means for condensing the light transmitted or reflected by said color wheel, and illuminating said spatial light modulator, wherein said spatial light modulator is operable to modulate the light incident from said illumination means;

projection means for projecting the light modulated by said spatial light modulator on a screen; and shading means for shading a part of the light incident on said color wheel or the light transmitted or reflected by said color wheel, by controlling an opening in a rotational direction of said color wheel.

10. The field sequential color display device of claim 9, wherein a size of said light transmission part of said shading means varies with a wavelength of the light transmitted or reflected by said color wheel.

11. The field sequential color display device of claim 9, further comprising:

light elimination means for eliminating part of light of a specific wavelength band from the light incident on said light transmission part of said shading means.

12. The field sequential color display device of claim 9, wherein said shading means is positioned on a radiation side of said color wheel.

13. The field sequential color display device of claim 9, wherein said shading means is positioned at a 5 mm or less air gap with said color wheel.

14. The field sequential color display device of claim 9, wherein said light source is an extra-high pressure mercury lamp.

15. The field sequential color display device of claim 9, wherein a plane of said shading means orthogonal to an optical axis of said shading means is approximately circular in cross section.

16. The field sequential color display device of claim 9, wherein said condensing means is an ellipsoidal mirror.

17. The field sequential color display device of claim 16, wherein said color wheel has a light transmitting surface or a light reflecting surface which is positioned in a vicinity of a long focus of said ellipsoidal mirror.

18. The field sequential color display device of claim 9, wherein said color wheel comprises fan-shaped red, green and blue color filters which are positioned in a form of a disk, and said color wheel successively transmits the light of the respective red, green and blue bands by rotation.

19. The field sequential color display device of claim 18, wherein said shading means shades part of incident light with respect to a rotational direction of said color wheel, but does not shade the light with respect to a radial direction of said color wheel.

20. The field sequential color display device of claim 19, wherein said shading means is a diaphragm having an opening of a predetermined size through which the incident light is passed, an opening width of said diaphragm with respect to the rotational direction of said color wheel is set to be equivalent to or smaller than a diameter of a condensation spot which is formed on said color wheel in an initial stage of use of said light source, and an opening width of said diaphragm with respect to the radial direction of said color wheel is set to be larger than the diameter of the condensation spot.

* * * * *